United States Patent

Griner

[15] 3,638,575
[45] Feb. 1, 1972

[54] ANALOG CONTROL SYSTEM
[72] Inventor: Ralph R. Griner, Mount Clemens, Mich.
[73] Assignee: Palmer-Shile Company, Detroit, Mich.
[22] Filed: July 3, 1969
[21] Appl. No.: 838,767

[52] U.S. Cl. ........................... 104/1, 214/16.4 A, 246/182 B
[51] Int. Cl. ........................................................ B65g 43/00
[58] Field of Search .................. 214/16.42; 246/182 B, 187 B

[56] References Cited

UNITED STATES PATENTS

| | | | |
|---|---|---|---|
| 3,318,260 | 5/1967 | Gillespie | 246/187 X |
| 3,402,836 | 9/1968 | Debrey et al. | 214/16.42 |
| 3,457,403 | 7/1969 | Smith | 246/187 |
| 3,519,805 | 7/1970 | Thorne-Booth | 246/182 B X |
| 3,523,232 | 8/1970 | Hall et al. | 318/611 |

Primary Examiner—Arthur L. La Point
Assistant Examiner—George H. Libman
Attorney—Harness, Dickey & Pierce

[57] ABSTRACT

A feedback control system for use in connection with automatic material-handling apparatus for controlling the acceleration and/or deceleration curve of a movable material-handling assembly, as for example, an automatic or semiautomatic robot used in conjunction with delivering and retrieving material from a storage warehouse, wherein the distance from a fixed or variably selectable point is sensed and utilized to generate a speed curve for controlling the incremental variation in speed of the material-handling apparatus up to a preselected maximum speed or down to zero speed.

71 Claims, 21 Drawing Figures

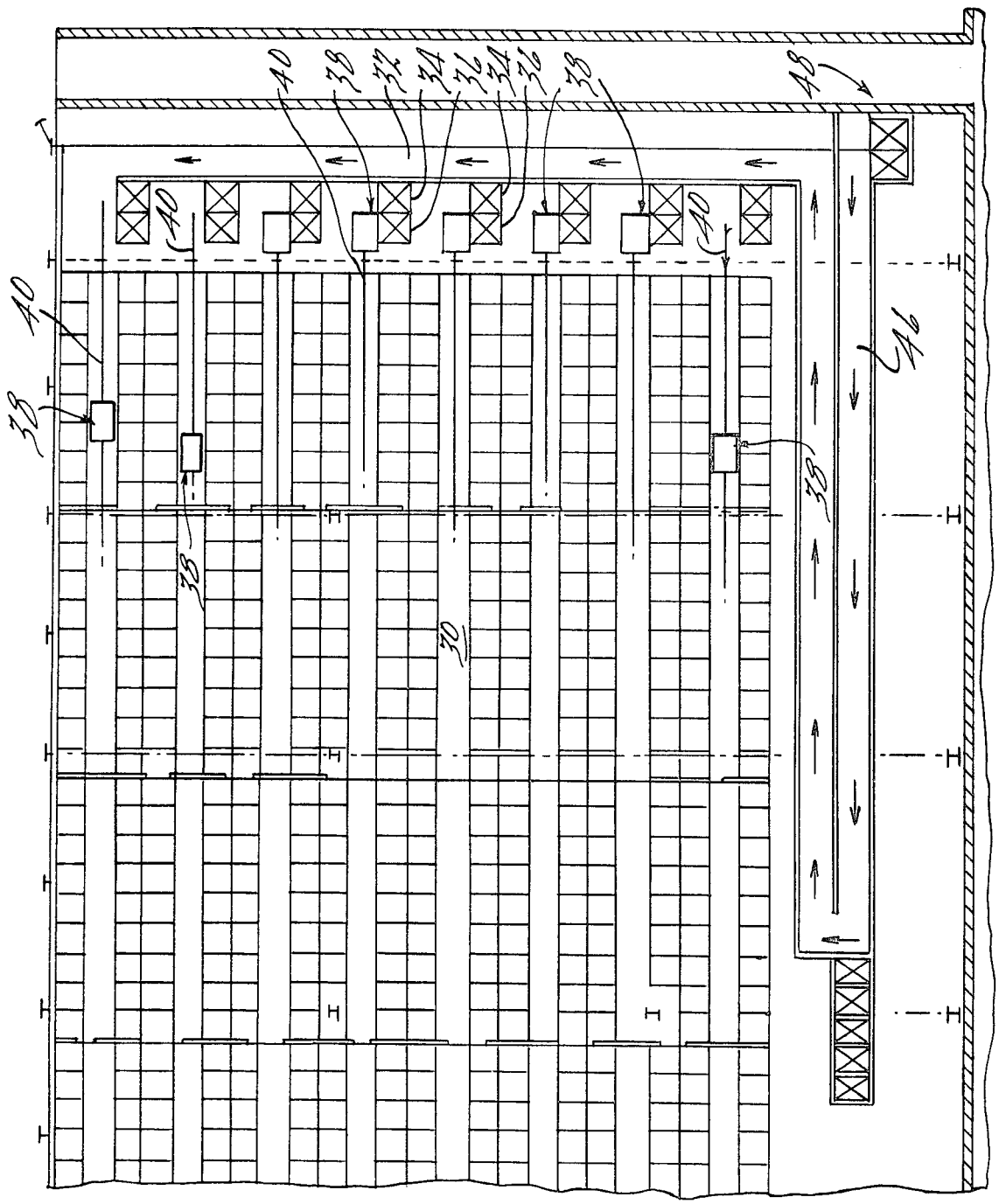

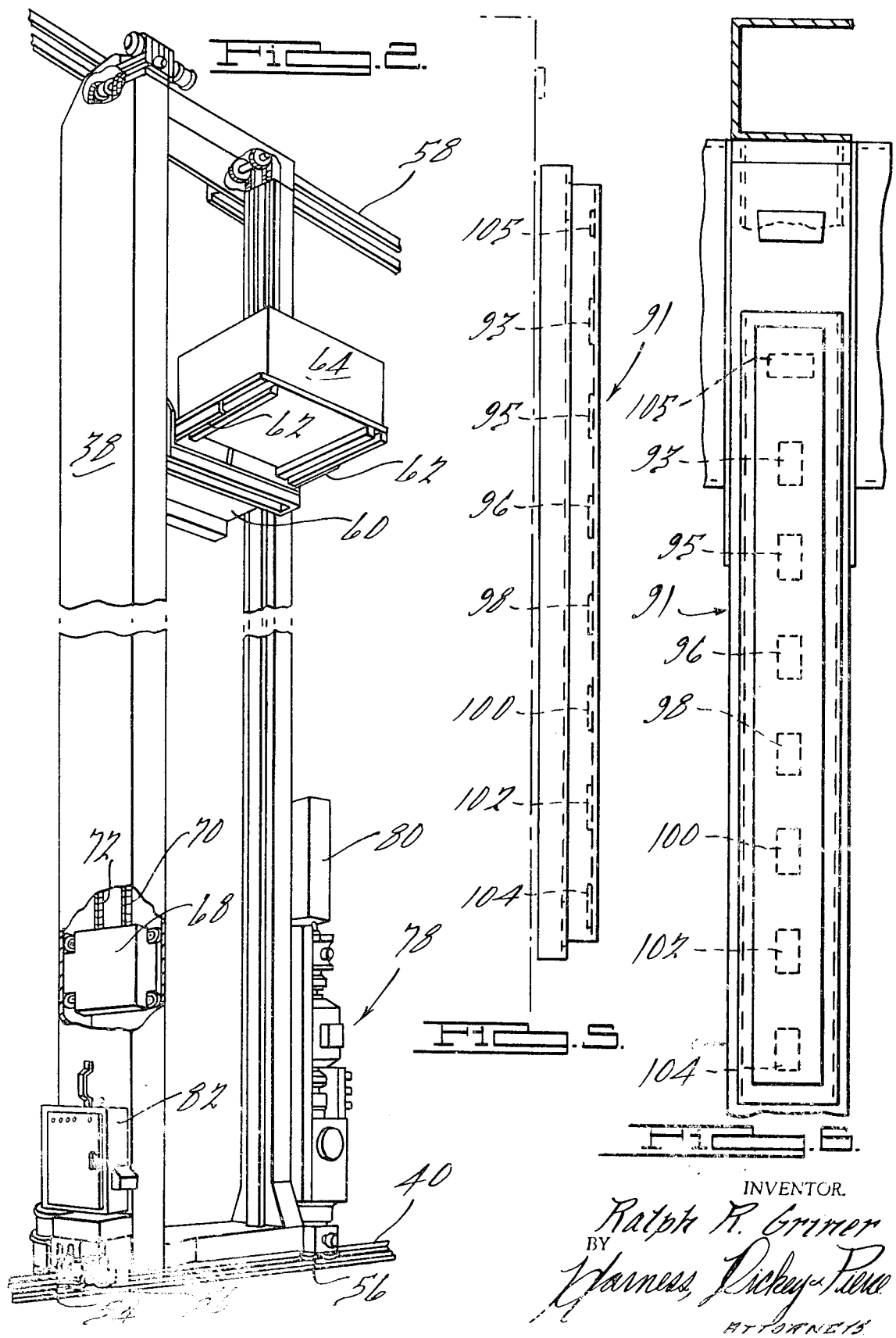

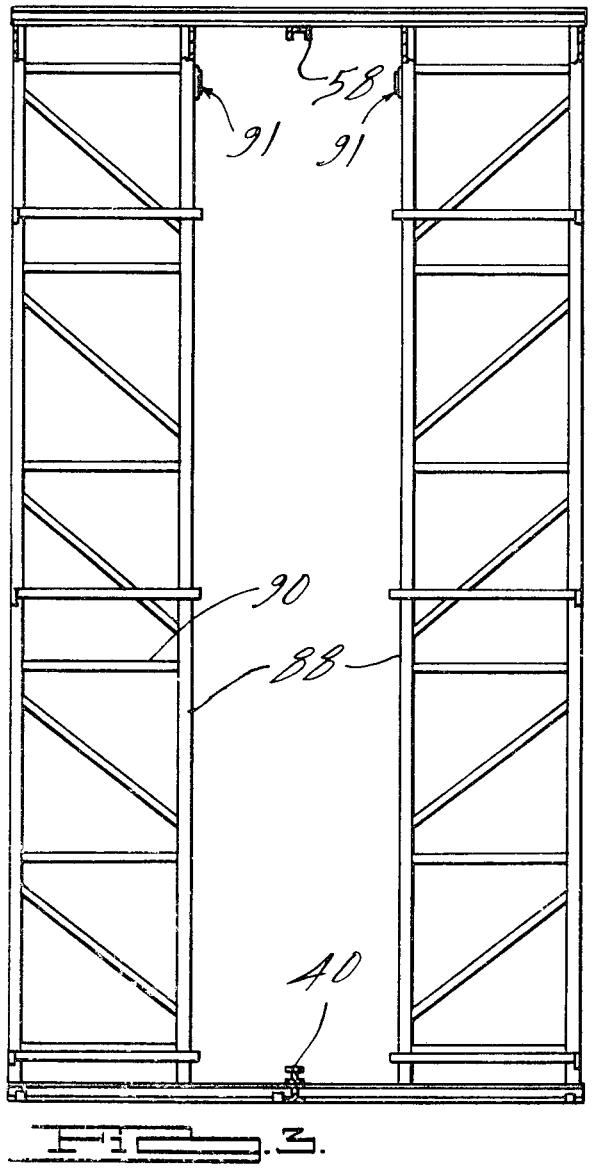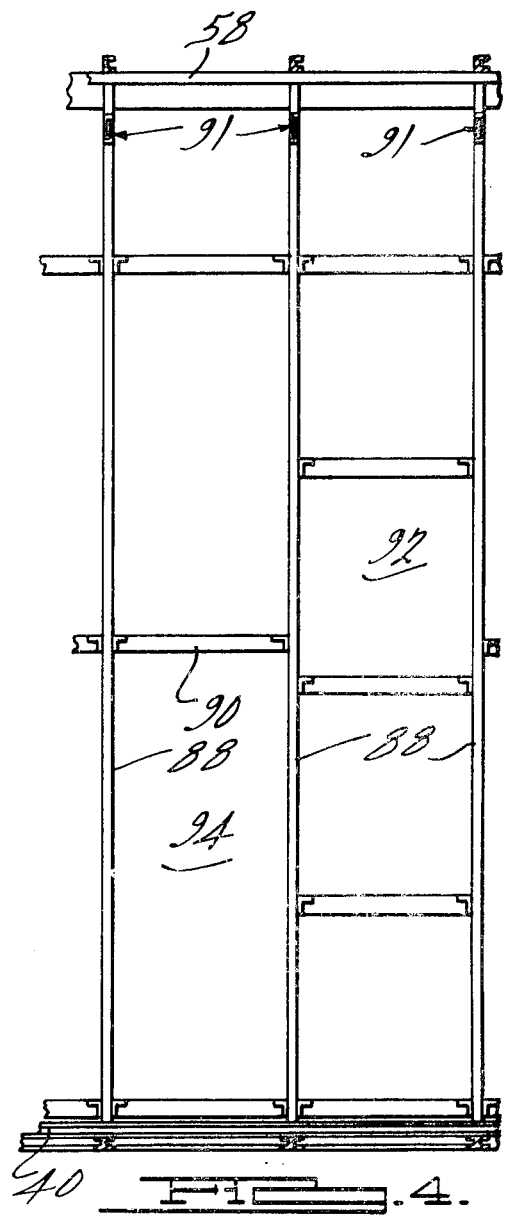

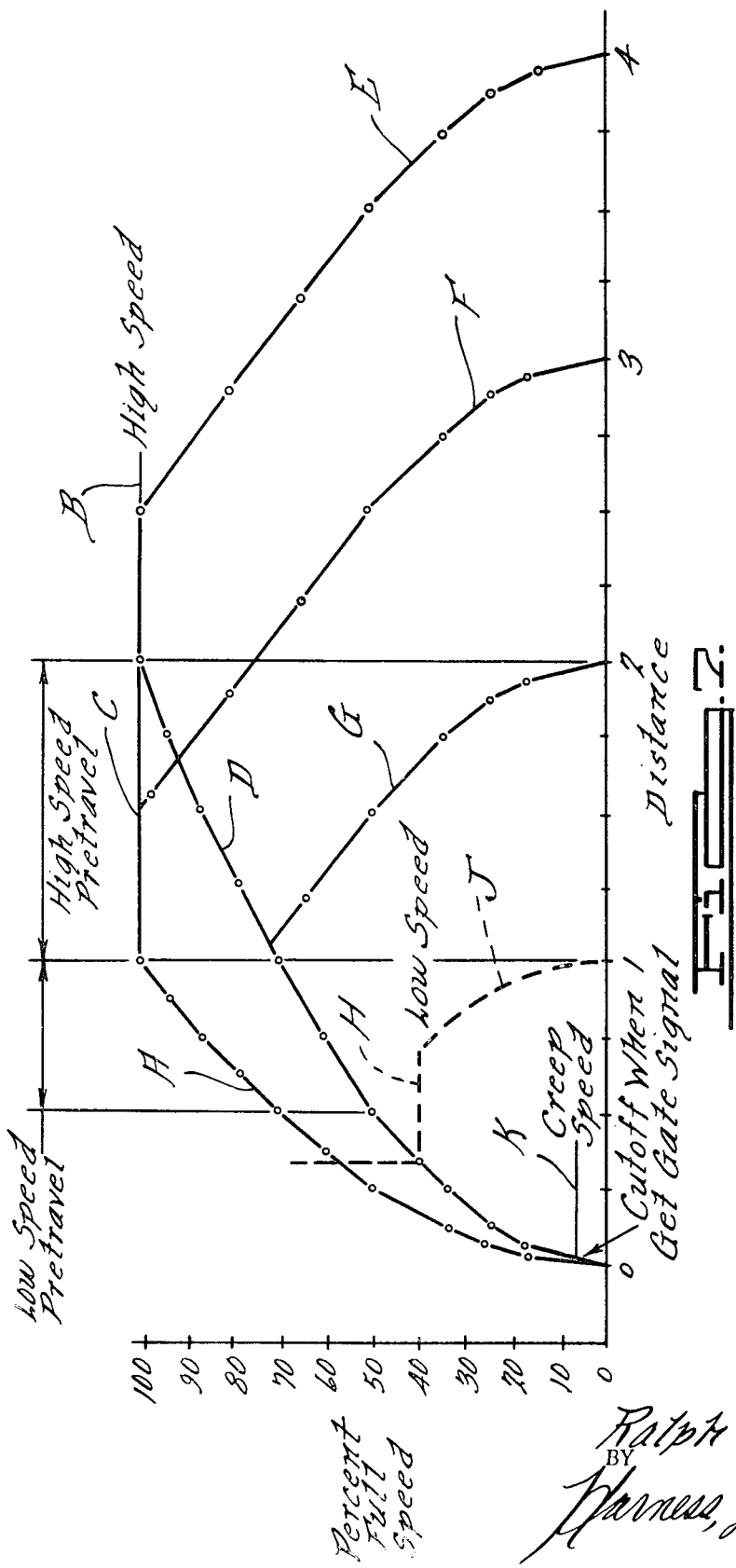

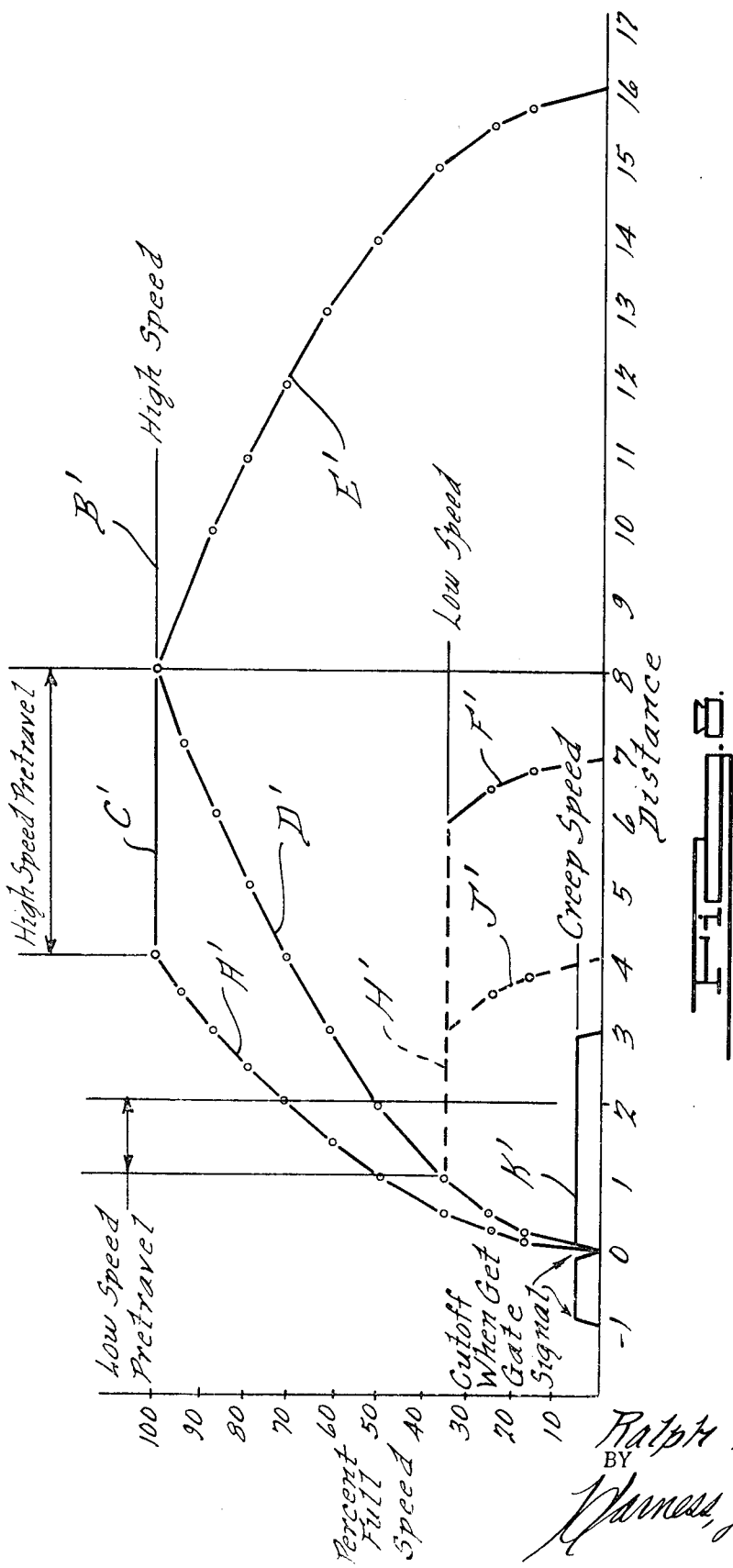

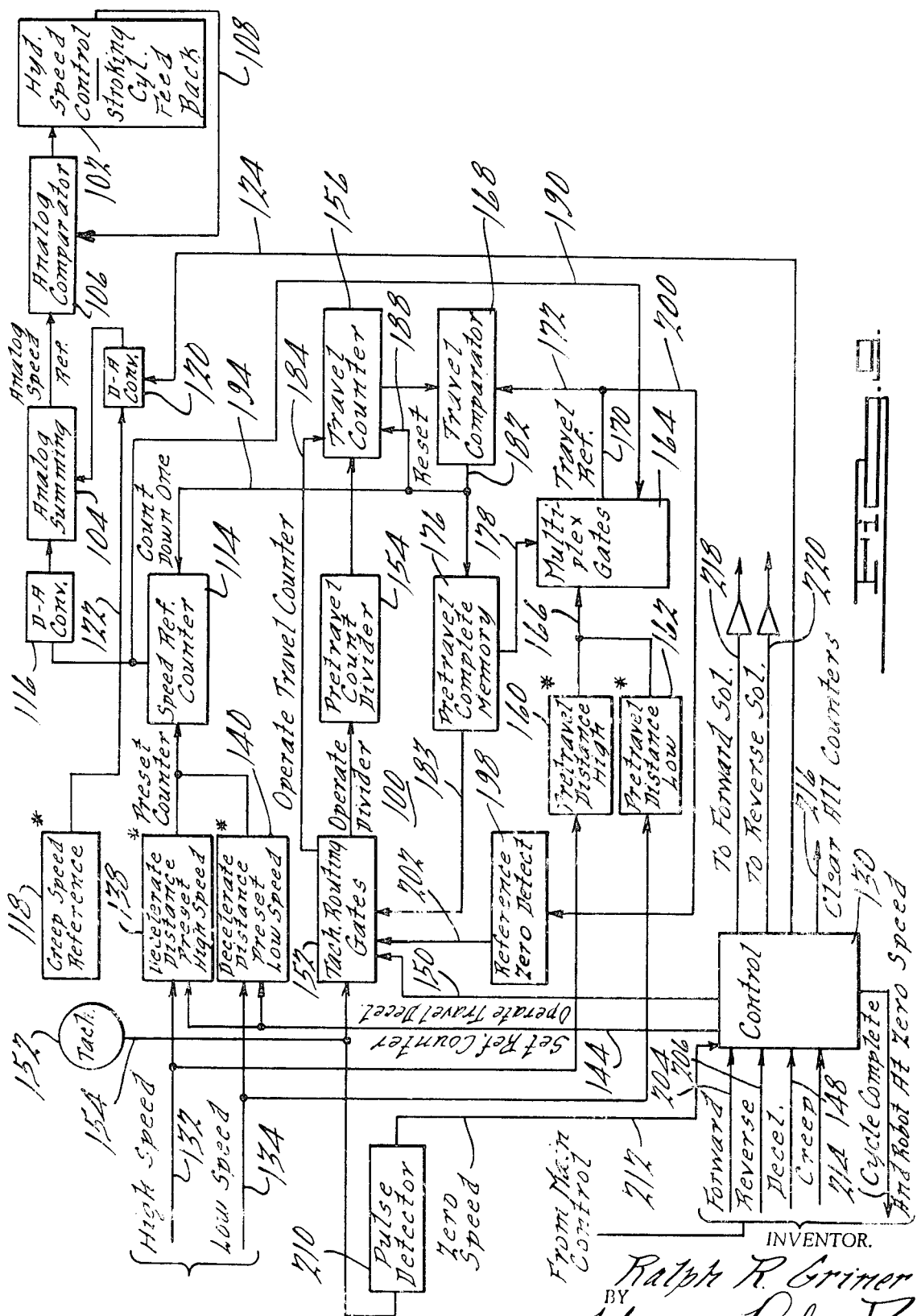

ANALOG CONTROL SYSTEM

BACKGROUND AND SUMMARY OF THE DEVELOPMENT

This invention relates generally to acceleration and/or deceleration, feedback, control system for a driving motor, and more particularly to acceleration and/or deceleration characteristic control system utilizing an internally generated acceleration or deceleration curve signal which is particularly adapted to utilize, in conjunction with the automatic or semiautomatic material-handling systems, the acceleration or deceleration curve being generated in accordance with a speed-versus-distance function.

In material-handling systems which incorporate a conveying device, as for example, a robot for handling palletized loads, it is desirable to operate the material-handling device at as great a speed as is practical to progress from one station to another station or a position adjacent another station. Subsequently, the system is devised to accelerate and decelerate the material-handling device as rapidly as possible consistent with accurately positioning the material-handling device at the preselected stopping point and preventing undue horizontal forces on the material being handled.

Automated material-handling machines are in common use in many processing industries, as for example, in the automatic warehousing industries. These machines are particularly adapted to automatically transfer palletized loads from an input station to a preselected address station which corresponds to a particular bay within the storage complex. Further, the automatic transfer system must elevate the palletized load to a preselected level within the bay, deposit the load at that level. The automatic transfer mechanism may have been given a second command, or may be given a second command at that time, to subsequently pick up a second load at a different station and deliver the second load to a conveying apparatus for pickup. Thus, the automatic transfer mechanism must accelerate the load with the capability of being able to decelerate and accurately stop at the second pickup address. Thereafter, the transfer mechanism will accelerate toward a home station and finally follow a deceleration cycle to stop at the home station and deposit the load. The system of the present invention is described in conjunction with an automatic robot type of material handling which is adapted to be utilized in an automatic warehousing complex. However, it is to be understood that other material-handling systems may utilize principles of the present invention, as for example, systems which are adapted to transfer workpieces to a successive number of processing stations.

In certain areas of the material-handling control art, systems have been utilized to control acceleration and deceleration (dv/dt) using a feedback signal from a tachometer, for the speed-sensing type, to control the system. Thus, the system is controlled in response to a speed-versus-time relationship. Certain other systems have been evolved which utilize a relatively complex hydraulic motor control system which must be very precisely controlled and/or predicted to anticipate the inherent mechanical and hydraulic inertia of the system. Thus, it is necessary to predict the response time of the various elements of the system, for example, the hydraulic portion of the system, in order to accurately position the work-handling assembly relative to the final position desired.

In accordance with the system of the present invention, an electrical analog feedback control has been devised which utilizes the principle of controlling the speed of a material-handling apparatus in response to a speed-versus-distance relationship. Specifically, a continuously operating pulse generator and coder assembly, such as a Baldwin precision shaft position encoder, may be utilized to generate output pulses in direct response to and directly driven by the drive wheels or other precision responsive portion of the material-handling apparatus. The continuously generated pulses are generally not utilized during the full-speed operation of the system, i.e., when the system is not in the acceleration, deceleration or pretravel mode of operation. However, when it is determined that the position of the equipment requires an acceleration or deceleration mode of operation, an acceleration or deceleration curve is generated in response to the gating of the pickup device for the encoder. The energization of the pickup may be accomplished substantially instantaneously due to its electrical characteristics, and the sensed pulses are utilized as a measure of distance traveled by the robot.

The output from the pickoff, once energized, appears as a series of pulses, the number of pulses being a fixed constant for linear distance of travel of the material-handling assembly, in the order of approximately 2,000 pulses per revolution of the wheel in the Baldwin encoder or approximately 32 pulses per linear inch of travel. These pulses are fed into a counter which controls a digital-to-analog converter system, the output of which varies in accordance with a preselected function of the number of input pulses. This output is utilized to control the motor driving the particular material-handling assembly being controlled.

Generally automatic systems of the type referred to in this application, by way of example, generally comprise a carrier or automatic robot which is movable along a trackway, the trackway being disposed adjacent to and parallel with the open side of a storage frame. The storage frame defines storage racks or bins on which palletized material loads may be stored. A carriage is mounted on the carrier or automatic robot and is adapted to be vertically movable relative to the track and storage frame and the carriage is provided with a work-handling platform or forks for transferring a load laterally between the carriage and the storage frame at preselected ones of the racks or bins. The carrier may be disposed in an aisle between two storage frames with the platform or a pair of forks being insertable into either storage frame, either by turning of the carriage or by symmetrical movement of the platform in either lateral direction.

The carrier preferably has a home position or input station which may, for example, be located at one end of the aisle. The input station is conveniently located for loading and unloading the carrier and may serve as a reference point from which the carrier, carriage and platform or forks start in a sequence of movement designated to deposit a load in a storage frame, retrieve a load from the storage frame or transfer loads within the system. The system could further be extended to perform any other series of movements required to the operation of a material storage system. However, in the system to be described in conjunction with the present invention, the home position is not utilized as the reference point from which the carrier operates. Rather, a series of coded indicia blocks are supplied along the frame, which indicia blocks are sensed by the traveling carrier to determine at what particular location the carrier is passing at any particular time. It is the coded blocks which are utilized to start the acceleration or deceleration cycle rather than the generation of a position signal relative to the home station.

To carry out the above sequence of movements or commands, the carrier is provided with a means for storing and carrying out the commands such as a signal storage and readout of programming system, wherein coded commands may be stored in an electronic or magnetic storage register or other like storage device in a receiver carried by the carrier, which said coded commands are read out to effect the desired sequential movement. In the particular system to be described, 35 bit commands are used to describe the storage or retrieval operations to be performed.

In the system of the present invention, the commands are transferred from the computer to the fixed command console which is mounted adjacent the home station. The commands are then transferred to the automatic robot through an optical, magnetic, or other type of "through air" systems. The commands given to the robot are stored within the robot and utilized in its travel down the aisle to the selected coded address, as sensed from the coded blocks mounted on the frame. The racks are provided with the series of coded address tabs as described above, which tabs are sensed by a device on the robot to indicate to the robot when that particular position has been reached, the sensed position occurring before the ultimate position to be achieved.

Thus, the control system includes a warehouse storage complex, as for example, racks, which are formed into a series of horizontally disposed and vertically aligned bins, a robot which is capable of accepting commands from a central inventory computer system, a computer interface, a command module interface which includes equipment to transmit commands from the computer to the robot, logic control and positioning equipment and robot drive system. The particular invention to which this application is directed will be described in conjunction with a robot drive system such as is adapted to be utilized in conjunction with a Cutler Hammer, dual command, cycle control system of the positive address type. In one particular control system contemplated, a system is provided which includes a capacity of 95 vertical and 95 horizontal increments of distance. The control system is capable of a dual command cycle; that is, it can accept, store and retrieve commands simultaneously and direct the robot to perform the two commands in sequence.

The cycle is started with the robot in the home position with the pallet table emptied and centered. Under these conditions, the interface unit will generate and transmit a continuous "robot ready" signal to the inventory computer. When the computer has a command for the robot, it sends a binary coded 14-bit address command (seven vertical bits and seven horizontal bits for the address) to the interface for a store or retrieve command. In the contemplated system, the signals are sent to the unit serially, but it is to be understood that parallel systems are also contemplated. After the address code has been fed to the unit, a start-cycle signal is transmitted and sent to the interface to activate the table drive mechanism to extend the mechanism into the pickup station. When the control system receives a signal that the table is fully extended, it will signal the drive mechanism to stop and subsequently signal the lift mechanism on the robot to raise the load. When the signal is received that the lift is completed, the control system will signal the table to return to the central position.

When the table is fully retracted, the control system will signal the hoist to raise or lower, depending upon the location of the selected opening, the lift and simultaneously will give the travel drive a signal to go forward. When the vertical motion is at the preselected opening, it will stop and wait until horizontal motion stops at the preselected position in the case where the horizontal positioning requires more time than the vertical positioning. The opposite is true in the case where the vertical positioning requires more time than the horizontal. Upon arriving at the selected position, a signal is sent to the table to extend, lower or retract. After the load has been deposited, the control system will direct the robot directly to the selected retrieve location, where the cycle will be reversed. When the load has been retrieved, the robot will be directed to the delivery station and the load will be deposited. Upon depositing of the load, the robot will signal the computer that it is ready to receive another instruction.

In the specific system illustrated, the mechanism on the robot for sensing the coded signals on the frame provides a deceleration signal when the proper coded position has been reached by the robot traveling along the aisle. By way of example, this coded signal is set to be generated at least two bays away from the selected stopping position in the case of the high-speed deceleration curve or one bay away from the selected stopping position in the case of the low-speed deceleration curve. This control signal is utilized to start the counting of the pulses generated from a continuously operating tachometer which generates a preselected number of pulses per unit of linear or vertical travel.

Also, the control system of the present invention provides a preset distance which is a binary coded number representative of the set pretravel distance which is desired to be traveled by the robot. The pulses from the tachometer are divided to a lower number and the count of the divider are compared to the pretravel distance binary number set into the system and, when the travel comparator indicates that a number of pulses has been generated which is representative of the preset-pretravel distance, a signal is generated which indicates the completion of the pretravel portion of the cycle. Upon the completion of the pretravel portion of the cycle, the tachometer pulses are rerouted directly into the travel counter. A second number, generated in a second digital set switch and set into a reference counter, is directed into the travel comparator through a gate circuit, which number is representative of the speed being traveled by the robot.

The control system of the present invention includes the speed reference counter which is provided with a preset digital number corresponding to the maximum travel speed which is desired for the robot during the deceleration portion of the curve, or, in the case of an acceleration curve, the speed reference counter will achieve a number which is representative of the maximum speed to which the robot will attain upon acceleration. This speed reference counter number is converted, in a digital-to-analog converter, to provide an analog signal which is representative of the speed at which the robot should be traveling. This analog signal is utilized to control the stroking cylinder in a hydraulic pump, utilized in a preferred embodiment of the present invention, which in turn controls the speed of the hydraulic motor. Referring, by way of example only, to the deceleration curves, the speed reference counter is supplied with a binary digital number representative of the maximum speed at which the robot will travel.

The initial digital numbers set into the speed reference counter is modified (decremented) by additional circuitry, the speed reference counter and the additional circuitry comprising a function generator which takes the form of an acceleration or deceleration curve generator. Particularly, the system receives a signal to decelerate due to the fact that the robot has reached a preselected position relative to the final position to be achieved. This deceleration signal is fed to a set of routing gates which directs pulses from a position tachometer generator, the pulses from the tachometer being fed to a travel counter through a pretravel count divider. In the system of the present invention, the deceleration cycle includes a pretravel portion and a deceleration portion, the pretravel portion being at a relatively fixed speed and the deceleration portion causing the machine to decelerate along a predetermined speed-versus-distance deceleration curve generated within the system.

The system further includes a pretravel distance digital switch, into which is set a pretravel distance binary number corresponding to the distance which the robot will travel during the pretravel portion of the cycle. This number is fed into a travel comparator which compares the pretravel number with the count in the travel counter of the pulses generated by the tachometer and fed into the travel counter. When a coincidence is achieved between the count in the travel counter and the pretravel distance number, a signal is generated to indicate the completion of the pretravel portion of the cycle. Also, the completion of the pretravel portion causes the number in the speed reference counter to be fed into the travel comparator for decrementation. Further, the completion of the pretravel portion of the cycle provides a signal to the routing gates to route the pulses from the tachometer directly to the travel counter rather than dividing the pulses from the tachometer by a preselected number, in this case, 16.

The number in the speed reference counter is then fed to the travel comparator and set into the travel comparator for comparison with the pulses being generated from the tachometer. Upon a coincidence of the number from the travel counter with that set into the travel comparator, a signal is generated to decrement the speed reference counter by a one digit. In this way the speed reference counter is reduced by one each time the travel comparator indicates a match between the number set into one side of the travel comparator with the pulses being fed through the travel counter. Generally, the comparator is set to sense a coincidence or match between the two inputs to the comparator.

When the speed reference counter has been decremented to a count of zero, the system will creep at a preselected speed determined by a bias which is fed into the analog circuit controlling the hydraulic motor. When the robot senses that it is a zero distance from the stop point on the frame, a zero distance signal is generated to disable the creep speed biasing circuit and stop the robot. When the robot is stopped, a circuit is provided to sense the fact that zero pulses are generated from the tachometer and the various solenoids utilized to control the robot are disconnected.

Accordingly, it is one object of the present invention to provide an improved control system for a material-handling apparatus.

It is another object of the present invention to provide an improved electrical analog control system for controlling the acceleration and deceleration characteristics of a material-handling assembly.

It is a further object of the present invention to provide an improved control system for material-handling apparatus which control system functions as a characteristic of a speed-versus-distance curve.

It is still another object of the present invention to provide an improved motor control system for use in connection with a material-handling apparatus wherein the control system has relatively little mechanical or hydraulic inertia.

It is still a further object of the present invention to provide improved feedback control system for controlling the acceleration and deceleration characteristics of a material-handling system wherein a continuous distance signal is generated and preselected portions of the distance signal are selected for use in controlling the drive of the material-handling apparatus.

It is another object of the present invention to provide an improved positioning system for use in connection with the material-handling apparatus, which system is responsive to achieving a preselected distance from a selected stopping point.

It is still a further object of the present invention to provide an improved function generator system which generates an acceleration or deceleration curve in response to a pulse configuration being generated with reference to distance.

It is still another object of the present invention to provide improved speed-versus-distance function generator which includes a continuously generated distance signal, the distance signal being utilized during a portion of the travel of the material-handling apparatus, the function generator being responsive to the distance signal during a portion of the travel.

It is another object of the present invention to provide an improved system for generating an acceleration or deceleration curve which includes comparing a preset indicia of speed with distance being traveled, and decremating the speed signal in response to traveling selected distances.

It is still another object of the present invention to provide an improved digital-to-analog conversion system for providing a control signal for a motor utilized in a material-handling system.

It is still another object of the present invention to provide an improved pretravel control circuit for use in connection with a material-handling apparatus.

It is still a further object of the present invention to provide an improved system for generating a pretravel signal for controlling the speed of a material-handling device, the termination of the pretravel speed control being responsive to the sensing of the travel of the predetermined distance.

It is still a further object of the present invention to provide an improved system for indicating the achievement of a preselected stopping point.

It is still a further object of the present invention to provide an improved timing system for an automatic control system.

It is still another object of the present invention to provide an improved digital input system for a presettable, digital counter.

Further objects, features and advantages of this invention will become apparent from a consideration of the following description, the appended claims and the accompanying drawings in which:

FIG. 1 is a plan view of a typical automatic warehouse storage arrangement incorporating certain features of the present invention;

FIG. 2 is a perspective view of a robot which may be utilized in conjunction with the automatic warehouse storage system of FIG. 1;

FIG. 3 is an end elevation view of the storage racks forming the automatic warehouse storage area of the present invention;

FIG. 4 is a face elevation view of the storage racks of FIG. 3;

FIG. 5 is an end view of the coded magnetic tabs utilized in identifying the address of the bay horizontally along the aisle of the storage system;

FIG. 6 is a face elevation view of the coded tab of FIG. 5;

FIG. 7 is a speed-versus-distance curve illustrating the horizontal acceleration and deceleration characteristics of the robot;

FIG. 8 is a speed-versus-distance curve similar to the graph of FIG. 7, and particularly illustrating the vertical acceleration and deceleration curves;

FIG. 9 is a schematic block diagram of the control system incorporating certain features of the present invention and utilized to control either the vertical or horizontal acceleration or deceleration characteristics of the robot illustrated in FIG. 2;

Figure 10:
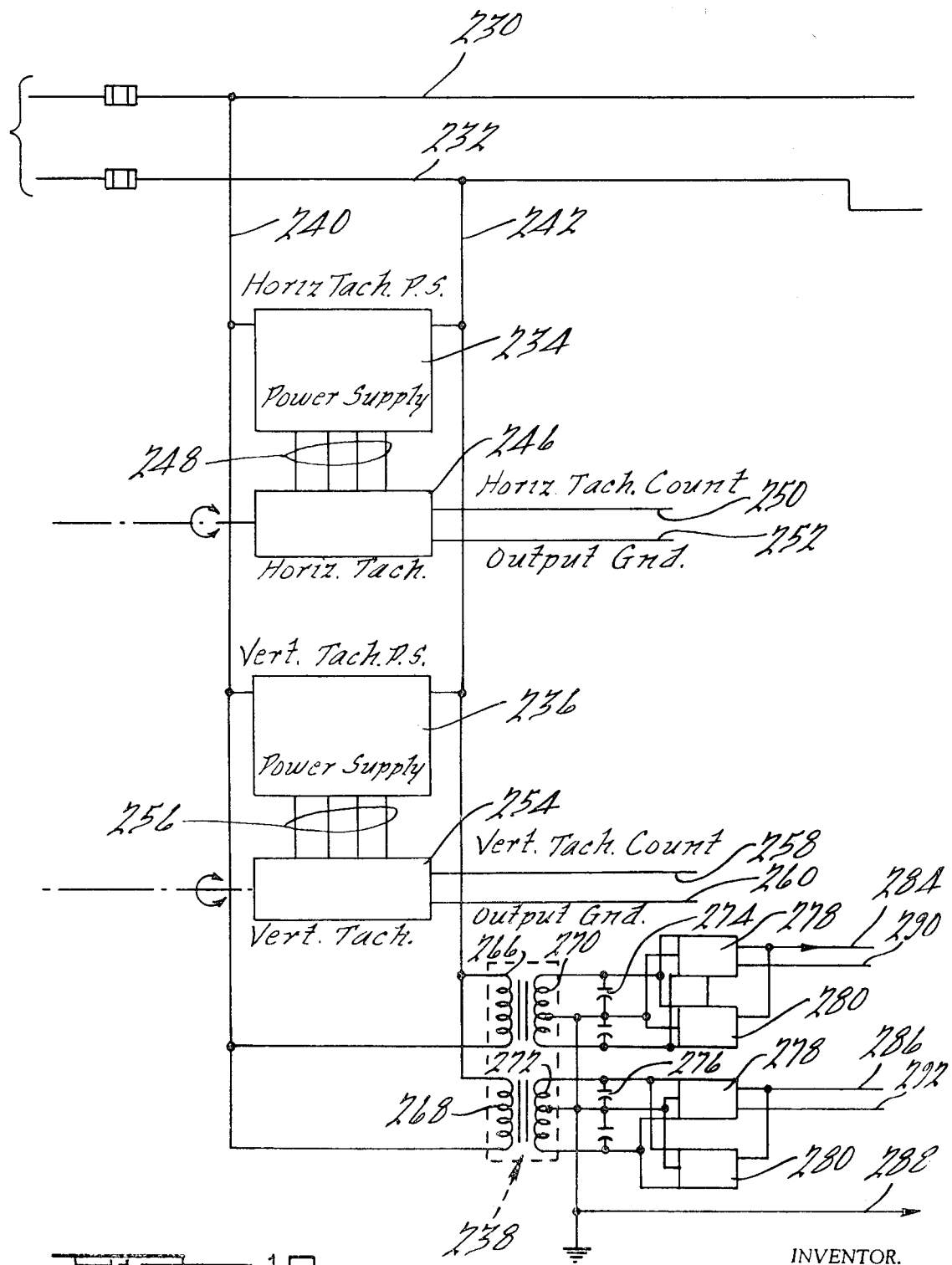
FIG. 10 is a partial schematic diagram illustrating certain details of the system of the present invention illustrated in FIG. 9, and particularly illustrating the vertical and horizontal tachometers.

Referring now to the drawings and particularly to FIG. 1 thereof, there is illustrated an automatic warehousing storage complex 30 into which is adapted to be automatically stored palletized loads of elements, as for example, automobile parts which are inventoried prior to assembly on the finished automobile. In a preferred form, the improved automatic storage system of my invention employs a plurality of conveyors for transferring palletized loads into selected volumes or storage positions in the storage area or warehouse 30. Generally, the palletized loads move on an inflow conveyor, such as a continuously moving belt conveyor 32, which travels adjacent the storage area 30. Means are provided for identifying the pallets or loads as to size of load, frequency of use, etc. This information is fed to a central computer (not shown) which is utilized to provide a storage address for each load, the storage address being selected by the computer in accordance with the type of load being stored, its frequency of use, the amount of the same type of load which is already in storage and other factors.

The palletized loads are transferred from the main end storage conveyor to selected temporary storage platforms 34, 36 which are adjacent the open end of each aisle. The first storage platform 34 is provided immediately adjacent the inflow conveyor 32 and the second temporary storage platform 36 is provided immediately adjacent the home station of a robot type of carrier 38, 20 described above. The loads are transferred from the main storage area to each of the temporary storage platforms 34, 36 by means of any well-known type of conveying apparatus, the walking beam type of conveyor being utilized in the preferred system of the present invention.

As was stated above, each second temporary storage platform 36 is provided adjacent an aisle, the aisle being provided with a single track 40, which is adapted to support and guide the robot 38. Each individual aisle is provided with one of the carriers or robots 38 to store and retrieve palletized loads from the selected aisle. The carriers are powered operated to permit the pickup of a load or pallet from a temporary storage platform and travel with the load to a selected or predetermined position along the aisle. The carrier is controlled in its travel by an electrical control system which is rendered responsive to the sensing of a coded address positioned on each vertical portion of the frame and in response to the generation of an acceleration or deceleration curve within the control system. It is to be understood that the robot may be controlled either from a manual control or from the automatic control system to be described hereinafter.

As will be seen from a description of FIGS. 3 and 4, each aisle is formed by storage racks or shelves which define different storage levels upon which may be stored one or more of the palletized loads described above. In the storage mode, a carriage on the carrier is controlled by a vertical control system, the vertical control system being substantially identical to the horizontal system, to accelerate and decelerate the palletized load in the vertical direction. Upon sensing that the palletized load is at the preselected vertical level the carriage is stopped and the forks of the carriage are extended into the bin to deposit the palletized load within the vertical bin. Upon depositing the load, the forks are retracted to the home position within the carriage.

If the robot has been given a retrieval command, the robot is accelerated to a second position wherein the carriage is vertically positioned adjacent the load to be picked up. After the load has been picked up, the robot is returned to the home position by a sequential acceleration and deceleration mode of operation. In certain systems, the first or second bay from the home position is spaced an unusual distance from the home position relative to the other bays, thereby requiring additional pretravel of the robot for operation at or near the home position.

For purposes of discussion, the horizontal travel of the robot along the track within the aisle will be designated the horizontal motion and the motion of the carriage relative to the carrier or robot will be designated the vertical motion. Further, extension of the forks on the carriage into the storage bays will be designated the Z direction.

Upon returning to the home station, the loads are transferred onto an outgoing continuous conveyor which may be positioned below the inflow conveyor 32. Upon reaching the end position, the outgoing conveyor may be acted upon by an operator in removing certain parts, wherein the remainder of the palletized load is fed down a secondary inflow, continuous conveyor 46 to feed the load back into the system. In the alternative, the entire pallet may be removed by means of a fork truck or other material-handling apparatus. The input station 48 includes an automatic palletizing apparatus which is adapted to provide pallets to incoming loads and also to remove pallets from outgoing loads.

In addition to the feeding of input loads and removal of outgoing loads, a system is provided for sizing the load by means of an optical system wherein the edge dimensions of the load and the vertical height of the load are sensed to be within as to whether the dimensions of the load are within limits. Further, it is contemplated that a weighing station will be provided to insure that the load is not too heavy for the system. The load is then conveyed down to a computer station where an address and identification is assigned to each of the loads. This computer station may be positioned anywhere along the input conveyor 32, but the position of the computer should precede the first aisle if the load is to be visually identified by an operator.

The designation of the load may either be accomplished by means of an IBM punchcard or the like being attached to the load before it is delivered to the system, or the computer operator may generate a punchcard as the load passes the station. The load may be categorized by the number of elements on the pallet, the type of elements, the precedence of the load (that is, the rate or use of the items on the load) and any other identification which may be desired to be assigned to the load. The computer then selects an address for the load depending on the size, its precedence and the availability of spaces within the system. This information is then stored in the computer for future storage retrieval and is also fed to the particular aisle to which the load is being directed. This information will be transmitted to the robot as will be explained hereinafter. As for the size of the load, it is contemplated that the system will be capable of handling several sizes of pallets. In this regard, it is contemplated that the system will be provided with the pallet storage assembly 48 on both the right and left side of the main conveyor system, and the pallets may be selected in accordance with the particular load being fed to the system.

Each load, as it progresses down the main conveyor 32, is tracked by the computer in accordance with the number of steps the conveyor system has taken since the information was fed to the computer. Thus, as the palletized load is positioned abreast of the computer station, a starting point is positioned provided for the computer to track the load through the system. The computer will then count the duration of time it takes the load to reach a preselected aisle either by counting steps of the main conveyor or by counting time.

When the particular load reaches its assigned marshalling area or robot home station, a shuttling system is activated to transfer the load from the main conveyor assembly or line 32 to the marshalling area. This transferring of the load is accomplished in two steps, preferably by means of a walking beam type of transfer system. The two steps include the movement of the load from the main conveyor line 32 to a first station 34 and thence to the second station 36 adjacent the robot. The double station at the marshalling area is utilized to permit the storage of two loads at the marshalling area thereby permitting the system to store loads while the robot is performing its assigned tasks in the aisle. The robot will pick up the load from the second station in accordance with the commands being fed to the robot by the computer. Accordingly, the load is first transferred from the main conveyor to the first station and is then transferred to the second station if a second load is not already present at the second station. If there is a load present at the second station, the load will merely wait at the first station until the load at the second station is picked up by the robot.

The signals from the computer are fed to the selected robot by means of a magnetic or optical system. In the preferred system, the interface is a magnetic device presently being sold under the trade name "MAITROL." This system contemplates utilizing a binary information system wherein the commands are fed to the robot by means of a plurality of binary bits. As was stated above, the robot is capable of receiving dual commands at the home station. Accordingly, if it is contemplated that the robot will deliver a load and pick up a load, the dual commands will be fed to the robot simultaneously. It is to be understood that the robot normally receives the commands at the home station by means of the "MAITROL" system described above and no commands will be transmitted to the robot while the robot is being moved through the aisle.

When the robot has received the commands for a particular load, the load is picked up as described generally above. The robot reacts in accordance with the commands it has received which correspond to the particular load being picked up. As the system is presently contemplated, the robot will proceed down the aisle with a stored address and will sequentially sense coded magnetic tabs, to be described in conjunction with FIGS. 5 and 6, until such time as the robot senses that it has reached a preselected position horizontally in the aisle. When the robot reaches this position, a deceleration cycle will be initiated, which deceleration cycle includes a pretravel portion and a deceleration portion. This deceleration cycle will be particularly described in conjunction with the description of FIGS. 9 to 21.

The address to the robot also will include a right or left address to permit the robot to deliver a load either to the right of the aisle or to the left of the aisle. Further, the address will include a vertical address, which vertical address will be correlated with a particular vertical position of the carriage relative to the carrier. Once the robot has delivered its load to the selected storage bay, it will either pick up a subsequent load in accordance with the second of the dual commands, or will return to the home station to pick up another load.

In the case of a command to pick up a load, the operation of the robot will be reversed, that is, it will accelerate to pickup station, and it will decelerate and stop at the pickup station, pick up the load, and accelerate toward the home station. Upon reaching a preselected position distant from the home station, the deceleration cycle will be initiated to cause the robot to decelerate and stop at the home position. The robot will then place the retrieved palletized load on the outgoing conveyor for transmission to the input station, this load will either be rearranged and selected parts removed or the entire palletized load will be removed by a fork truck.

Referring now to FIG. 2, there is illustrated the robot 38 which is adapted to travel along the track 40, the robot including a set of vertically disposed wheels 54, the wheels 54 having a horizontal axis, and a plurality of horizontally disposed wheels 56, the wheels 56 having a vertically disposed axis, for guiding the robot along the track 40. The aisle also includes a second track 58 which is utilized to guide the upper portion of the robot 38 in its travel in the aisle. As was stated above, the robot carrier 38 includes a carriage mechanism 60 having a pair of forks 62 which are adapted to engage the underside of a palletized load 64. The carriage 60 is adapted to be vertically movable relative to the main body portion of the robot to thereby lift the loads into a position adjacent the bay to which the load is to be stored. The system includes a vertical control mechanism 68 which is adapted to control a lifting motion of a chain 70 which is connected to the carriage 60 and also controls a second chain 72 which is adapted to control the inward and outward movement or Z axis movement of the forks.

The robot is moved along the track 40 by means of a hydraulic motor system 78, the control of the motor being accomplished by means of a plurality of control panels 80, 82. The vertical and horizontal control will be described more in detail in connection with the description of FIGS. 9 to 21.

Referring to FIGS. 3 and 4, there is illustrated a rack assembly which includes a plurality of vertically disposed racks 88 and several horizontally disposed racks 90 which form a plurality of bays 92, 94. It will be noted that the bays 94 are of larger dimension than the bays 92 to permit the storage of larger loads.

Referring now to FIGS. 5 and 6, there is illustrated a coded magnetic tab unit 91 which is utilized to provide an address for each of the horizontally spaced bays within the rack assembly. The strip unit 91 includes a plurality of magnets 93, 95, 96, 98, 100, 102, 104 which are magnetized north and south or vice versa, in the vertical direction, in accordance with a binary coded system indicative of the address of the particular bay being sensed. The coded units are placed adjacent the upper extremity of the vertical frame elements 88 and are positioned sufficiently close to the robot 38 to permit the magnetic element to be sent by a sensor unit positioned on the robot 38 (not shown). It is to be understood that the magnetic tab unit 91 may take any other form other than magnetic, that is, a coded set of limit switches, an optical system such as the "opticator" system described above, etc. However, in the preferred system, it is desired that the particular bay being sensed by the robot be particularly or peculiarly identified by means of a coded system.

Referring now to FIGS. 7 and 8, there is illustrated two acceleration and deceleration characteristic curves, FIG. 7 being specific to the horizontal motion of the robot, and FIG. 8 being illustrative of the vertical motion of the carriage with respect to the carrier. Referring specifically to FIG. 7, there is illustrated a deceleration curve A which is representative of a percent of full speed relative to the position of the robot with respect to the final stopping position desired. Accordingly, the curve A is a speed-versus-distance characteristic curve wherein the reduction in speed along curve A is a function of the position of the robot relative to its final stopping position. The curve A is approached at a high speed along curve B until such time as the robot achieves a position which is two bays away from the final stopping position. At that time, the deceleration cycle is initiated and the robot is placed in the pretravel portion of the deceleration cycle. This pretravel portion, in the illustrated embodiment, occurs for approximately one bay and is generally at the maximum high speed at which the robot approached the two-bay-away position. This pretravel distance is illustrated as straight line C and may be relatively adjustable with respect to the distance of travel during the pretravel portion of the cycle. A second deceleration curve, of longer duration at a lesser deceleration rate, is illustrated in curve D wherein the robot starts deceleration immediately upon the sensing of the two-bay-away position. In this situation the pretravel distance has been adjusted to be approximately zero and the robot immediately starts decelerating along the curve D. It is to be understood that a steeper curve than curve A could be achieved by lengthening the pretravel distance, thereby shortening the distance which the robot must stop. The system of the present invention is extremely versatile in this respect in that the pretravel distance and stopping distance on the deceleration portion of the curve is widely adjustable.

The robot, in its normal operation, will start from a home position as described above and will be accelerated to the maximum high speed designated as straight line B or 100 percent of full speed. It is desirable that the robot be accelerated 100 percent speed mode in as short a time as possible consistent with stability of the load and robot. These factors have been discussed above and are considered in generating a curve for the deceleration portion of the cycle. As is readily apparent, the same considerations are present for the acceleration. Accordingly, an acceleration curve E is generated which is seen to be approximately of the same form and duration as far as distance is concerned as the deceleration curve D. Accordingly, the robot is accelerated toward the two-bay-away position from the four-bay-away position, in the illustrated embodiment, by incrementally increasing the speed of the robot in response to distance travelled. Accordingly, the acceleration curve is also a speed-versus-distance function. It is to be understood that the acceleration curve may be generated to accelerate the robot to maximum speed in any distance consistent with stability, for example, in one bay.

The system is further provided with a means for accelerating the robot to a point in operation wherein the acceleration portion of the cycle is overridden by the deceleration portion of the cycle. For example, a curve F may be generated to accelerate the robot from the three-bay-away position and the robot should be stopped at the zero-bay-away position along the curve designated A. Accordingly, the robot is accelerated along curve F until such time as the maximum speed is achieved at the intersection of the curve F with the curve C. The robot will immediately be placed in the pretravel mode of operation and will complete the pretravel along curve C until such time as the robot achieves the end of pretravel position, which is one bay away in the illustrated embodiment. The robot will then decelerate along curve A until such time as the robot achieves a position very nearly at the final position to be achieved. At this time the robot then switches to a creep speed mode of operation, as will be more readily apparent from a description of FIGS. 9 to 21, until the robot exactly reaches the zero-bay-away position. Also, the system may be devised such that the robot accelerates on a second curve G from a two-bay-away position until such time as the robot intersects the deceleration curve D. When the robot reaches the point on the acceleration curve G wherein it intersects the deceleration curve D, the deceleration curve will override the acceleration and decelerate the robot to a point which is zero distance away from the final stopping position.

This system also is capable of providing a low-speed mode of operation wherein the robot is accelerated to a maximum speed which is approximately 40 percent of full speed as illustrated by curve H. Accordingly, the robot may be accelerated along curve J to a predetermined low speed. The robot will then travel at the 40 percent of full speed rate until such time as the deceleration mode of operation is initiated. As was the case above, the deceleration mode in the low-speed operation may also include a pretravel. In all of the situations described above, the deceleration curve will terminate in a creep speed mode of operation wherein the robot is caused to creep at a relatively low speed in the order of 0.5 to 2 percent of full speed until such time as the exact zero position is achieved.

FIG. 8 is a curve which is substantially identical to FIG. 7 with the exception that the increments of distance are smaller and the speed of travel is at a lesser rate. However, the curve has been presented in a percent of full speed versus distance travelled to illustrate the substantial identity between the horizontal and vertical motion. As was the case in FIG. 7, the vertical carrier is decelerated along the curve A' from a predetermined maximum high speed, designated curve B', after having travelled through a high-speed pretravel distance designated curve C'. Accordingly when the vertical motion has been initiated and accelerated to a high speed, the system will sense when the vertical carrier is approximately eight increments of distance away from the final stopping position and will initiate the deceleration mode of operation. Upon the initiation of the deceleration pretravel portion of the cycle along curve C'. Upon completion of the predesignated pretravel, the vertical carrier is decelerated along curve A'.

As was the case with FIG. 7, the vertical carriage may be accelerated relative to the robot along a controlled path, designated E' to the preselected high speed at a level of B' and then may be immediately started on a gradual deceleration curve D' or may follow the pretravel curve C' and the more steep deceleration curve A'. Further, the vertical system may include a low-speed mode of operation wherein the vertical carriage travels at a fixed maximum speed of approximately 35 percent of full speed designated at curve H'. The low speed may be achieved either by following curve E' in the acceleration mode or by accelerating along a second curve F'. As was the case previously, the low speed may have a pretravel distance and then decelerate along a curve D' until such time as the vertical carriage achieves approximately the final stopping position. The carriage then may creep along at a creep speed designated K' until the final position is achieved. At this time the vertical carriage is completely stopped and the fork is operated in the Z direction.

Referring now to FIG. 9, there is illustrated a schematic block diagram of the system 100 of the present invention. The system includes a hydraulic speed control assembly 102 which may, in the preferred embodiment, include a plurality of valves, at least one of which is variable to vary the speed of a hydraulic motor associated therewith. The speed control system is operated in response to an electrical analog signal which is generated by an analog-summing network 104, the analog-summing network producing an output signal which is fed through an analog comparator circuit 106 to the hydraulic speed control. Accordingly, the magnitude of the output signal from the analog-summing circuit 104 will determine the speed at which the hydraulic motor is operated.

In controlling the hydraulic motor, it has been found to be necessary to check the actual setting of the hydraulic speed control against the correct setting for the hydraulic speed control, Accordingly, the position of the stroking cylinder is sensed by means of a stroking cylinder position feedback network 108, which feedback network senses the actual position of the stroking cylinder and produces an electrical signal in response thereto. For example, the stroking cylinder position could be sensed by means of sensing the voltage of the slide portion of a potentiometer whereby the position of the stroking cylinder produces an output analog signal. This output analog signal is fed to the analog comparator circuit wherein a coincidence is made between the actual position of the stroking cylinder and the position to which the stroking cylinder should be set. If there is an error, the comparator produces an error signal and adjusts the hydraulic speed control, particularly the stroking cylinder.

The analog signal in the analog-summing circuit 104 is derived from a speed reference counter circuit 114, which speed reference counter circuit is, in the preferred embodiment, a presettable, decrementable, digital counter. Accordingly, when a binary number is preset into the speed reference counter, a digital output signal will be provided from the speed reference counter circuit 114. This digital output signal is fed through a digital-to-analog converter circuit 116, which circuit 116 converts the digital number in the speed reference counter to an analog signal. This analog signal is then fed to the analog-summing circuit 104 for use in controlling the hydraulic speed control 102.

As will be seen from a further description of the circuit, it is necessary to bias the analog-summing circuit 104 with a preset analog bias for causing the hydraulic speed control to create a creeping mode of operation for the hydraulic motor. This creeping bias signal is generated in a creep speed reference network 118, which creep speed reference network comprises, in the preferred embodiment, a digital set switch. The digital set switch may be readily adjusted to preset any desired digital number into the reference network 118.

The number set into the creep speed reference is fed to a second digital-to-analog converter 120 by means of a line 122. An enabling signal is generated on a line 124 to enable the digital-to-analog converter to convert the creep speed reference signal to an analog signal, which signal is summed in the analog-summing circuit with the signal from the speed reference counter. In this way, a biasing signal is set into the analog-summing network for prebiasing the hydraulic speed control, thus creating a creep speed mode of operation.

Thus, the hydraulic speed control is operated in accordance with the number set into the speed reference counter, this number being converted by the digital-to-analog converter 116 and fed to the hydraulic speed control through the analog-summing and analog comparator circuits 104, 106 respectively. Further, the analog-summing circuit is biased with a positive bias by means of a creep speed reference circuit 118 and a second digital-to-analog converter circuit 120. This bias is applied to the analog-summing circuit, in the event the enabling signal is present on conductor 124, to positively bias the analog-summing circuit to permit a creep speed mode of operation in the event that the speed reference counter is provided with a zero digital count.

As will be seen from a further description of the circuit, the deceleration portion of the deceleration cycle causes the speed reference counter to decrement to a zero count. At this time the system operates at a creep speed until such time as the system senses that the robot is exactly at the desired stopping position, at which time the enabling signal on conductor 124 is removed.

The system further includes a control circuit 130 which receives forward, reverse, decelerate and creep signals from the main control. These signals are utilized to tell the system whether to control the robot in the forward or the reversed directions and whether the system has reached the two-bay-away position, for example, and thus to place the robot into the deceleration mode of operation. The main control panel also provides a high-speed or low-speed signal on input conductors 132, 134, respectively, which indicate to the control system whether the robot is traveling at a high speed or 100 percent of maximum or at a low speed or approximately 40 percent of maximum speed. This information is important in indicating to the robot whether the deceleration curve will be started from a one-bay-away position or from a two-bay-away position.

In the case of the two-bay-away position, the robot will operate in the high-speed mode of operation, and in the case of the one-bay-away position, the robot will operate in the low speed. The speeds for the robot are present by means of decelerate distance preset circuits 138, 140, the circuit 138 presetting the high-speed mode of operation and the circuit 140 presetting the low-speed mode of operation.

The circuits 138, 140, in the preferred embodiment, comprise digital set switches wherein the operator may preset the speed at which the robot will operate in either the high-speed or low-speed mode of operation. It is to be understood that the number set into the circuits 138, 140 actually represents distance in the context of the speed-versus-distance concept of the present invention. The number set into circuits 138, 140 are capable of being transferred to the speed reference counter circuit 114 in the event that an enabling signal or setting signal is received from the control circuit 130 on a set reference counter conductor 144.

Accordingly, when for example, a forward command is received, an enabling signal is generated on conductor 144 which is gated with either the high-speed or the low-speed signals on conductors 132, 134 through circuits 138, 140 to select the proper decelerate distance number for setting into the speed reference counter circuit 114. This system will be described more particularly in conjunction with the description of FIGS. 10 to 21. However, the speed reference counter is provided with a number which will be indicative of the maximum speed at which the robot will operate for that mode of operation.

From the foregoing, it is seen that the robot is, in the deceleration example, operating at a set speed determined by the speed reference counter. Upon the sensing of, for example, a two-bay-away position in the high-speed mode of operation, a decelerate signal is received at the control circuit 130 on a decelerate conductor 148. This decelerate signal initiates the start of the decelerate mode of operation wherein a gating signal is generated on an operate travel decelerate conductor 150. The signal on this conductor is utilized to direct pulses from a distance signal tachometer 152, which may take the form of a Baldwin Precision encoder assembly, wherein pulses are generated in response to distance travelled.

As stated above, the tachometer may comprise a coded wheel, the coding on the wheel being sensed by a sensing unit wherein pulses are generated in response to the revolution of the wheel. The wheel is tied directly to the wheels of the robot, in the illustrated embodiment, so that there is a direct connection between the distance travelled or rotation of the wheels of the robot and the revolutions of the wheel within the tachometer or encoder 152. In one preferred embodiment of the above procession encoder, 37 pulses are generated by the tachometer per linear inch of travel of the robot. Thus, it is seen that a very fine control of the robot may be achieved. Further details of the Baldwin encoder may be found in the previously mentioned copending application of Harrison Cassel.

The tachometer pulses are fed to the tach routing gate circuit 152 by means of a conductor 154. The pulse on the enabling conductor 150 causes the pulses from the tachometer to be routed through a pretravel count divider circuit 154 to a travel counter circuit 156. Thus, the output pulses from the tachometer are fed to the pretravel count divider circuit 154, which circuit 154 divides the number of pulses generated by the tachometer by a specific number, in this case, 16. The output of the pretravel count divider circuit 154 is provided with a single pulse for each 16 pulses generated by the tachometer. This single pulse is fed to the travel counter for a purpose to be explained hereinafter.

As stated above, the deceleration mode includes a pretravel portion of the cycle wherein the pretravel is accomplished at a fixed maximum speed. This speed is set into the speed reference counter 114 as described above. However, it is necessary that the system sense when the pretravel is completed in order to start the deceleration portion of the cycle. The distance traveled in the pretravel mode may be preset by means of pretravel distance circuits 160, 162, the circuit 160 being set for the pretravel distance to be travelled in the high-speed mode of operation and the circuit 162 being provided with the pretravel distance to be traveled in the low-speed mode of operation. As was the case with the circuits 138, 140, the pretravel distance circuits 160, 162 are preferably digital set switches which permit the operator to vary the presetting of the pretravel distance.

The digital number from the pretravel circuit, selecting, for example, the high circuit 160, is fed through a multiplex gate circuit 164 by means of a conductor 166. The multiplex gate circuit 164 will direct the pretravel distance number set in the pretravel distance circuit 160 to a travel comparator circuit 168 by means of a conductor 170 and a second conductor 172. This is accomplished during the period that the multiplex gate circuit 164 senses that the system is still in the pretravel mode of operation. The end of the pretravel mode of operation is sensed by means of a pretravel complete memory circuit 176, which provides a signal on a conductor 178 for the multiplex gate circuit 164 to indicate that the pretravel mode of operation has been completed. This will be more fully explained hereinafter.

However, during the pretravel mode of operation, the travel comparator circuit 168 is provided with the number set in the pretravel distance circuit 160, 162. The travel comparator is also provided with a count of pulses from the pretravel count divider circuit 154 and the travel counter circuit 156. The travel counter circuit, as explained above, counts the number of pulses being generated by the pretravel count divider circuit 154. The digital count in the travel counter 156 is fed into the travel comparator circuit 168 for coincidence with the pretravel distance number set into the travel comparator circuit. When a coincidence is achieved between the pretravel distance number and the number in the travel counter, a signal is generated on an output conductor 182 which indicates the end of the pretravel portion of the cycle. This signal is fed to the pretravel memory circuit 176 which generates the signal on the conductor 178 to indicate to the multiplex gate circuit 164 that the pretravel is complete.

The output from the pretravel memory circuit 176 is also fed to the tach routing gate circuit 152 to cause the gate circuit 152 to direct the pulses from the tachometer directly to the travel counter circuit 156 by means of a conductor 184. Thus, the tachometer pulses are not divided but are set directly into the travel counter. The output from the travel comparator is also fed to a reset conductor 188 to reset the travel counter after the completion of the pretravel mode of operation. The output of the pretravel complete memory circuit 178, when fed to the multiplex gate circuit 164 by means of conductor 178, will cause the gate circuit 164 to accept the digital number from the speed reference counter as impressed on a conductor 190 and redirect the digital number of conductor 190 to the travel comparator circuit by means of conductors 170, 172. Thus, the digital number set into the speed reference counter circuit 114 is set into the travel comparator circuit 168.

This new number in the travel comparator circuit 168 from the speed reference counter circuit 114 is compared with the count of the tachometer pulses generated by the travel counter circuit 156. When the travel comparator achieves a coincidence or identity between the number set into the speed reference counter circuit 114 and the count generated in the travel counter circuit 156, an output pulse will again be provided on conductor 182. However, this pulse is primarily directed to the speed reference counter circuit by means of a conductor 194 to decrement the speed reference counter by a count of one. Thus, the number in the speed reference counter is decreased by one, in a binary sense, each time the travel comparator achieves a coincidence between the number set in the reference counter and the number of pulses counted from the tachometer 152.

This new number in the speed reference counter is then fed to the travel comparator by means of conductor 190, the multiplex gate circuit 164 and conductors 170, 172. The new number is compared to the count generated in the travel counter circuit 156 until the travel counter circuit 156 generates a count equivalent to the number of pulses equal to the number in the speed reference counter. It is to be noted that, every time a comparison is achieved, the travel counter circuit 156 is reset by a pulse generated by conductor 188.

From the foregoing, it is seen that the speed reference counter is decremented by a count of one in response to the distance traveled by the robot as sensed by the tachometer 152. The decreasing in the count of the speed reference counter decreases the speed being traveled by the robot due to the fact that the decreasing number in the speed reference counter circuit 114 is converted by the digital-to-analog converter and utilized to control the hydraulic motor through the hydraulic speed control. When the speed reference counter is decremented to a count of zero, the output of the speed reference counter is zero which is fed to the converter circuit 116 and provides a zero signal to the analog-summing circuit 104.

However, as was explained above, the creep speed reference circuit 118 provides a bias to the analog-summing circuit so that the analog speed signal fed to the hydraulic speed control is not zero during this creep speed mode of operation. The zero count in the speed reference counter is also fed through a reference zero detect circuit 198 by means of a conductor 200, the reference zero detect 198 providing a disabling pulse to the tach routing gate circuit 152 by means of a conductor 202. Thus, the pulses from the tachometer are not fed to the travel counter.

When the robot is at the exact spot at which the robot is to be stopped, the forward or reverse signal generated in the main control is eliminated, thereby eliminating the forward or reverse signal on conductors 204, 206. The elimination of these signals causes the control circuit 130 to eliminate the enabling signal to the digital-to-analog converter circuit 120 as generated on conductor 124. Thus, the creep speed bias being fed to the analog-summing circuit 104 is eliminated. In this situation the hydraulic speed control receives a zero signal, and the hydraulic motor is shut off.

When the robot stops, the tachometer 152 will discontinue generating pulses. The lack of a pulse generated by the tachometer 152 for a preselected period of time is sensed by a pulse detector circuit 210 and a zero speed output signal is generated by the pulse detector circuit 210 on a conductor 212. The zero speed signal on conductor 212 is fed to the control circuit 130, and signals are generated to indicate that the cycle is complete an conductor 214 and to clear all the counters on conductor 216. Also, during the period that the system has been in the deceleration mode, a forward or reverse solenoid which enables the hydraulic motor has been held on by a signal generated on a forward solenoid conductor 218 or a reverse solenoid conductor 220. When the robot is at the zero position, the signals on conductors 218 or 220 are eliminated.

Figure 11:
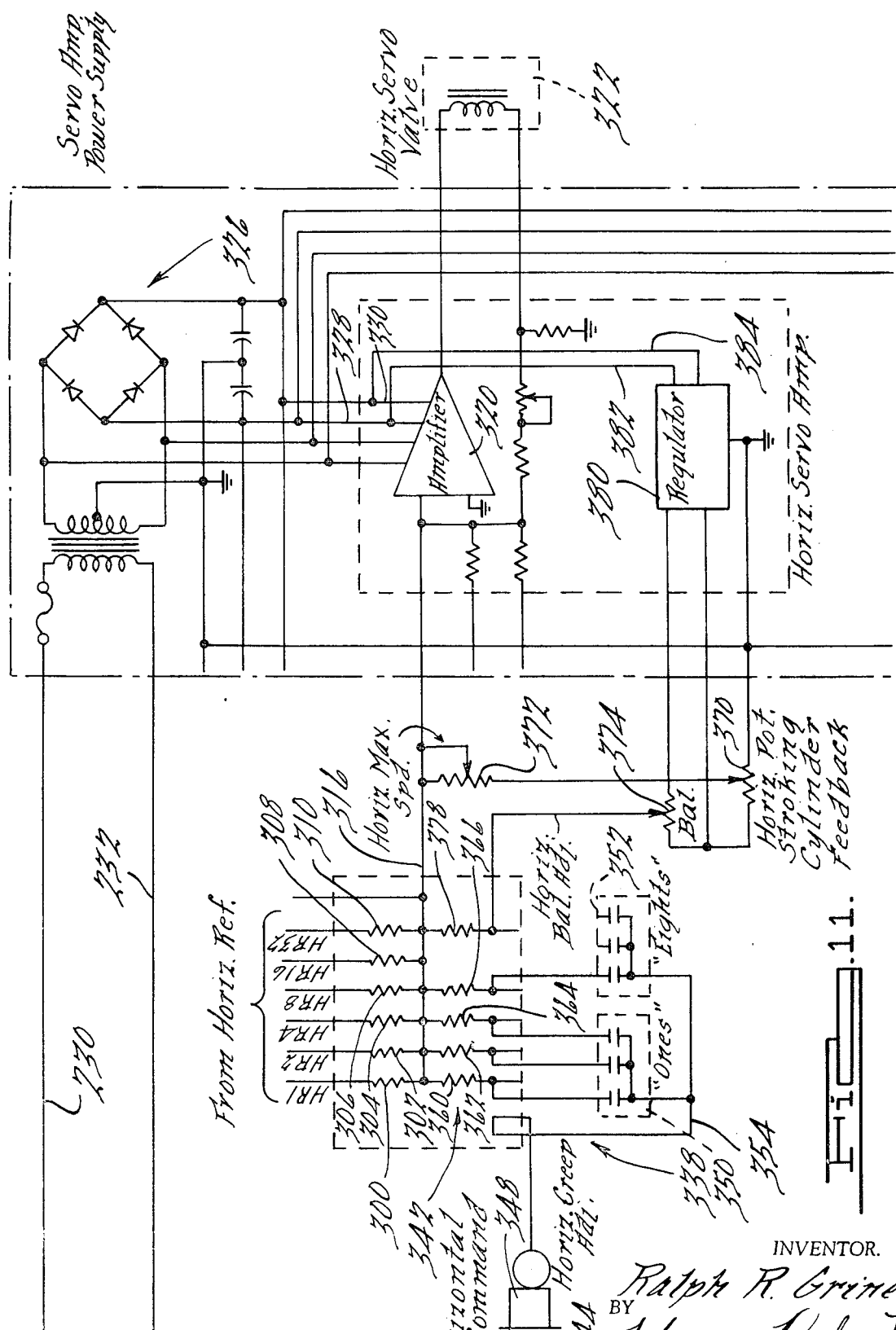
FIG. 11 is another segment of a schematic diagram illustrating certain other details of the system of the present invention, and particularly the horizontal go-command circuit and the horizontal servo valve.
Figure 12:
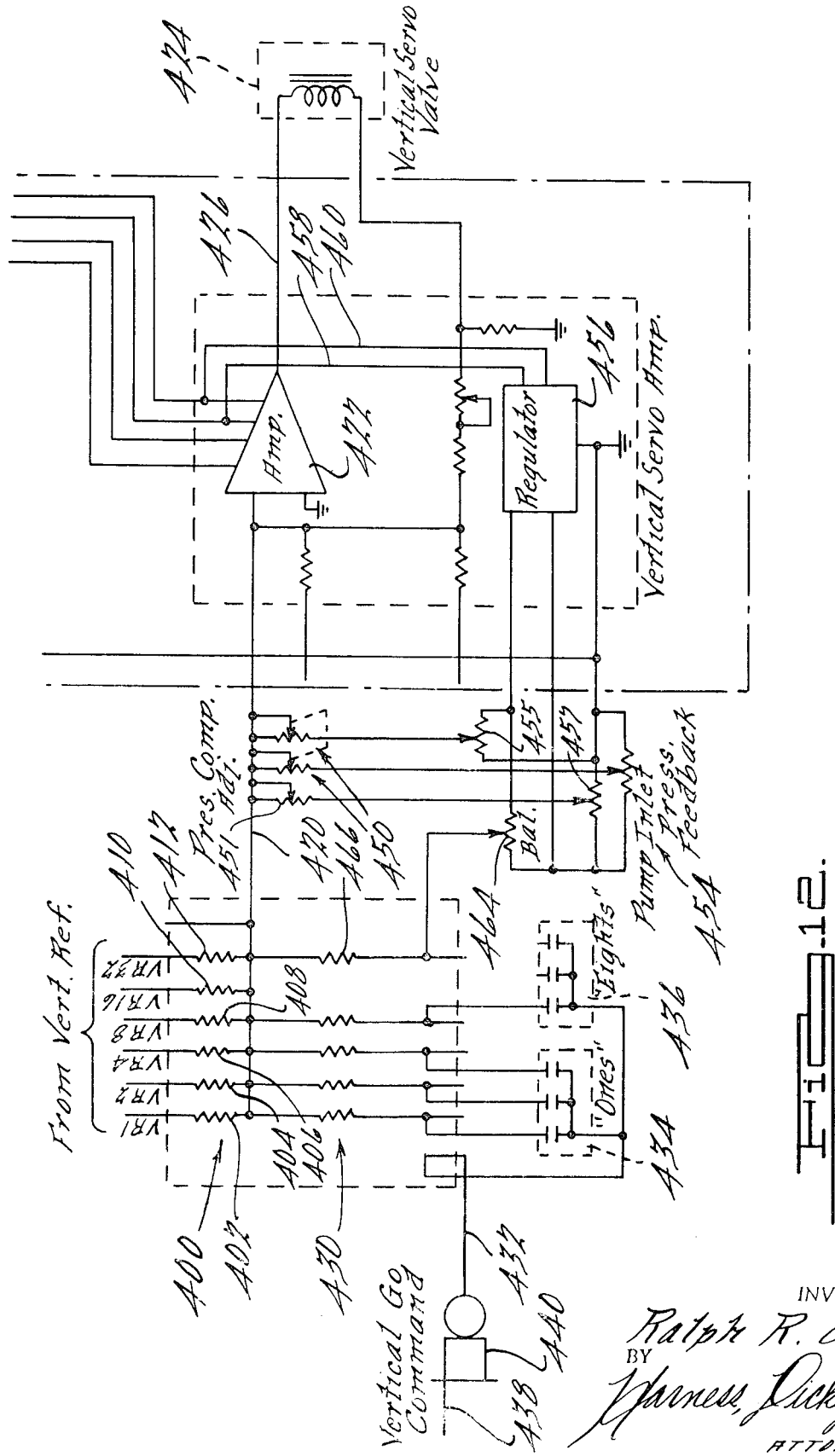
FIG. 12 is still another segment of a schematic diagram illustrating features of the present invention and particularly illustrating the vertical go-command and vertical servo valve circuits.

Referring now to FIGS. 10, 11 and 12, and particularly to FIG. 10, therein is illustrated a power supply circuit for the tachometers in the main power supply for the remaining portions of the system. Specifically, alternating current in said lines 230, 232 supply electrical energy to a horizontal tachometer power supply circuit 234, a vertical tachometer power supply circuit 236 and a power transformer 238. The horizontal power supply circuit 234 is connected across the incoming lines 230, 232 by means of conductors 240, 242 and is directly connected to the horizontal tachometer 246 by means of conductors 248. The output pulses from the horizontal tachometer are fed on an output circuit including an output line 250 and an output ground line 252.

The vertical tachometer is similarly interconnected in that the power supply 236 is connected across the line 240, 242 and the vertical tachometer 254 is connected with the power supply by means of conductors 256. The output of the vertical tachometer is fed to an output conductor 258 and an output ground conductor 260.

For purposes of explanation, it is to be understood that the circuits of FIGS. 10, 11 and 12 are common to both the horizontal and vertical control systems. However, the circuits of FIGS. 13 to 21 are particularly described in conjunction with horizontal circuit, and it is to be understood that the vertical circuit is substantially identical. During the progress of the description, if a difference exists between the vertical and the horizontal system, the difference will be noted generally and a circuit diagram explanation will be given.

The transformer assembly 238 includes a first primary winding 266 and a second primary winding 268 which are connected in parallel across the lines 240, 242. The transformer further includes a pair of secondary windings 270, 272 which are magnetically coupled to the primary winding, as is common in the art. The power supplies include the output of the secondaries which are connected through a plurality of filter capacitors 274 and 276 to a first set of regulators 278, which are considered master regulators, and a second regulator or slave regulator 280. The regulators 278, 280 are connected in parallel and provide a specified voltage at line 284 and 286 relative to ground potential at conductor 288.

The master power supply 278 also provides a system enable signal on an output conductor 290 in the case of the upper power supply and 292 in the case of the lower power supply, this enabling signal being utilized to inhibit the operation of the entire system during the period that the power supply is warming up. After the initial warmup period, the signal on conductors 290, 292 will permit the circuits connected thereto to operate. The master regulator 278 may be of the type presently being sold by Digital Equipment Corporation, the type K731 regulator. The secondary regulator 280 is also sold by the Digital Equipment Corporation under the designation of slave regulator type K732.

Referring now to FIG. 11, there is illustrated the horizontal digital-to-analog converter for the main control circuit which receives the digital signals from the horizontal speed reference circuit, the horizontal creep biasing circuit, the analog-summing amplifier and the horizontal servo valves. Specifically, the horizontal reference provides digital input signals to a plurality of input terminals designated HR1, HR2, HR4, HR8, HR16, HR32. The input terminals are connected to weighted resistors 300, 302, 304, 306, 308 and 310 which take the input signal on each line and weight it in accordance with the weight of the binary signal.

For example, the resistor 300 has a value which is approximately twice the value of the resistor 302. Similarly, the resistor 302 is twice the value of resistor 304, etc. One end of each of the resistors 300 to 310 is connected to a main current-carrying conductor 316, the current on the conductor 316 being an analog signal representative of the digital signals impressed on input terminals HR1 through HR32. This signal on conductor 316 is fed to a current-summing amplifier 320. The amplifier 320 provides a current to a horizontal servo valve circuit 322 which is proportional to the current flowing in conductor 316. Accordingly, for a fixed current, the servo valve will provide a fixed flow of fluid in the hydraulic motor. The servo amplifier 320 is provided with electrical energy from a servoamplifier power supply 326 by means of conductors 328, 330.

As described above, the system includes a horizontal creep adjust circuit 338 which provides a fixed bias for the servoamplifier 320 to provide a creeping speed at such time that the horizontal reference has been decremented to zero count. Specifically, the horizontal go-command is fed to a second digital-to-analog converter circuit 342 from an input conductor 344 and a noninverting gate circuit 348. The go-command is impressed on a plurality of switches 350 and 352 by means of a conductor 354 with any particular switch closed in the group 350 or any particular switches closed in the group 352, current will be fed through weighted resistors 360, 362, 364, 366. In the specific embodiment illustrated, the resistor 366 is one-half of the value of the resistor 364, the value of the resistor 364 is one-half of the value of the resistor 362, and the value of the resistor 362 is one-half the value of the resistor 360.

Accordingly, a biasing current is fed on conductor 316 when the horizontal go-command is present on input conductor 344. Several adjust circuits have been provided, for example, a horizontal stroking cylinder feedback impedance 370 and a horizontal maximum speed potentiometer 372. Further, a horizontal balance adjust potentiometer 374 is provided to provide additional bias current to the conductor 316 through a resistor 378. Each of the adjust potentiometers 372, 374 and the resistor 378 are fed with a regulated current from a regulator circuit 380, the regulator circuit being provided with direct current power from the conductors 328 and 330 by means of conductors 382, 384.

Referring now to FIG. 12, there is illustrated a vertical circuit which is substantially identical to the horizontal circuit described in conjunction with FIG. 11. Specifically, a digital-to-analog converter circuit 400 has been provided which is fed vertical digital signals through a plurality of weighted resistors 402, the output of the digital-to-analog converters fed on a current-carrying conductor 420 to a summing amplifier 422. The summing amplifier 422, as was the case in FIG. 11, provides an output current to a vertical servo valve coil 424 which is proportional to the current on conductor 420. Thus, for a constant current on a conductor 426, the vertical servo valve will provide a constant flow of fluid through the hydraulic motor.

The vertical system includes a second digital-to-analog converter 430 which is fed from an input conductor 432 through a plurality of digital switches 434 and 436. THe digital switches 434 and 436 are weighted as indicated on the drawing, and when a vertical go-command is impressed on conductor 438, current will flow through the noninverting gate 440 to the conductor 433 through the the closed switches 434.

As was the case with FIG. 11, a plurality of adjusting circuits are provided, particularly a pressure-compensating adjustment circuit 450 which includes a potentiometer fed from a pump inlet pressure potentiometer 454 and a potentiometer 455 fed from the pump outlet pressure. The potentiometers 454, 455 are fed from a regulator circuit 456 which is fed power from the power supply described in conjunction with FIG. 11 on conductors 458, 460. Also, a variable bias is provided to null the circuit with zero reference current in a potentiometer 464 and a resistor 466 which are connected to the conductor 420.

Figure 13:
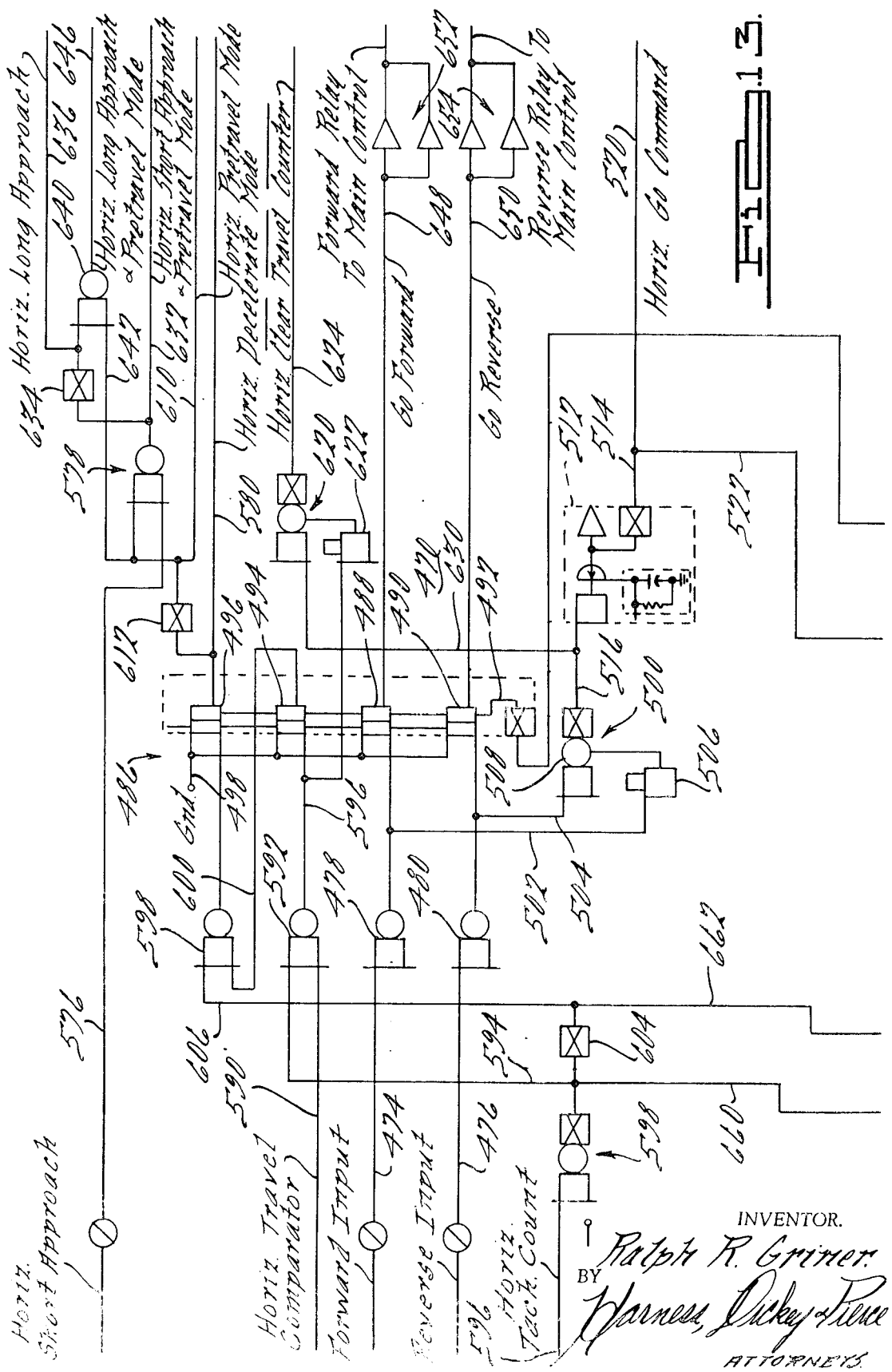
FIG. 13 is another segment of a schematic diagram illustrating still other features of the present invention, particularly illustrating the forward and reverse inputs for the horizontal motion.
Figure 14:
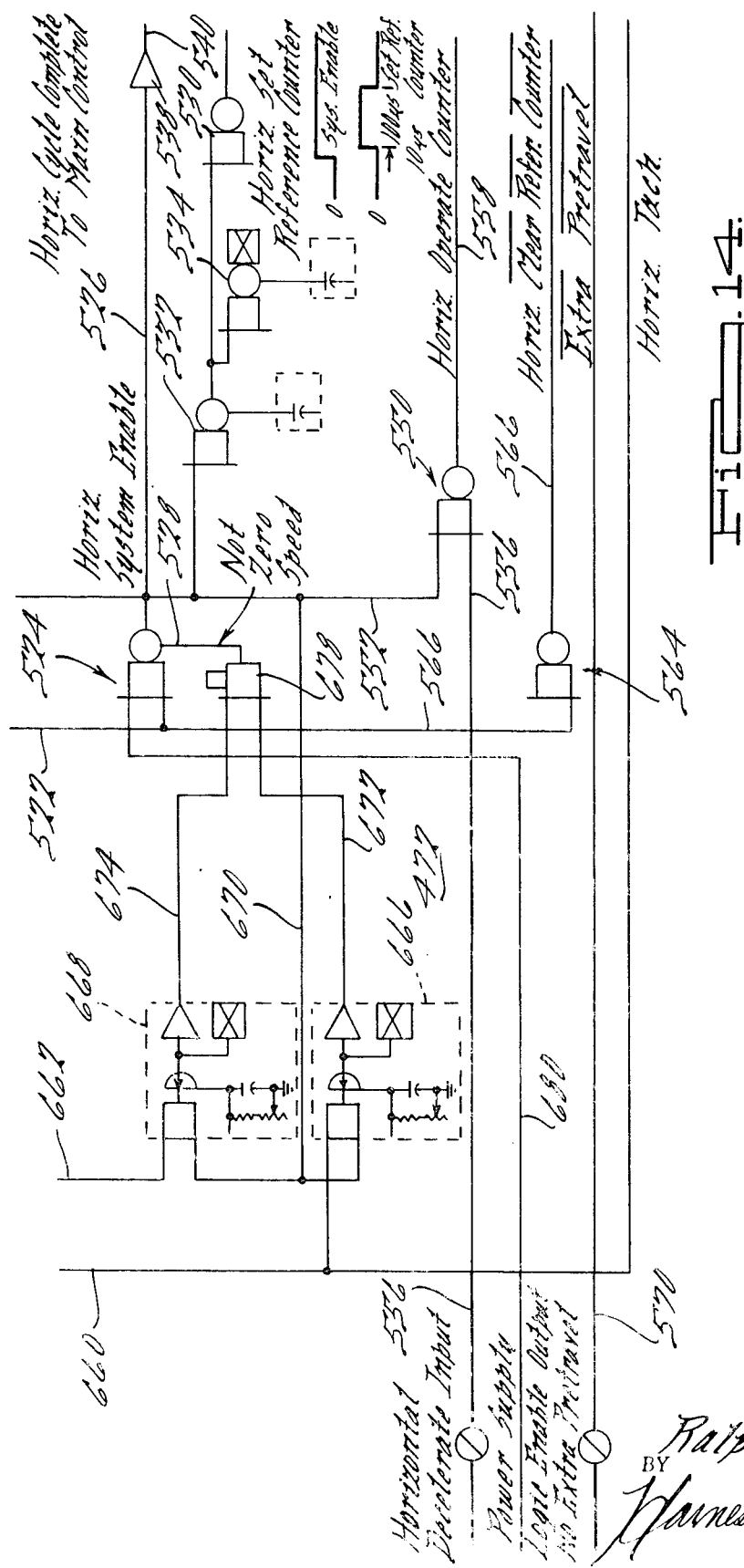
FIG. 14 is another portion of a schematic diagram illustrating still other features of the present invention and particularly illustrating the deceleration input portion of the circuit and the horizontal counter control outputs.

Referring now to FIGS. 13 and 14, there is illustrated a circuit 470, 472 which, in the blocked diagram of FIG. 9, was referred to as the control system. Specifically, the upper portion of the control circuit 470 may receive a forward input signal on input conductor 474 or a reverse input signal on the input conductor 476. These input signals on input conductors 474 and 476 are fed through noninverting gate circuits 478, 480 to two inputs of a bistable or flip-flop type of register 486. Specifically, the forward input signal on conductor 474 is fed to the set side of a first flip-flop circuit 488 and the reverse input is fed to the set side of a second flip-flop 490. The flip-flops are reset by means of a pulse impressed on a conductor 492 as will be more fully explained hereinafter.

The resetting pulse is fed to each reset side of the flip-flop modules including flip-flops 488 and 490 and flip-flops 494, 496. A ground signal is impressed on an input conductor 498 and fed throughout the flip-flop register 486. Forward and reverse input signals are also fed to an inverting gate circuit 500 by means of a conductor 502 and a conductor 504 respectively. The circuit 500 is an inverting gate and an expansion circuit 506 is utilized to provide a second input to the "OR" portion 508 of the gate 500. The combination of the circuit 500 and 506 may be characterized as an "OR/NOT" gate.

The output of the circuit 500 is fed into a timer circuit 512, which timer circuit includes a delay circuit for providing approximately a 100-millisecond delay in the output signal on output conductor 514 relative to the input signal on conductor 516. Accordingly, an output pulse will be provided on output conductor 514, which pulse will rise to a logical 1 level after the 100-millisecond delay. The signal on conductor 514 is fed to a horizontal go-command output conductor 520 to the system described in conjunction with FIGS. 10 and 12.

Also, the output of conductor 514 is fed to a conductor 522, which conductor 522 is connected to the input circuit of a noninverting gate 524. The output signal on conductor 524 is fed to a horizontal system enabling output circuit on output conductor 526. If the gate 524 is enabled by conductor 528, which conductor 528 represents the "not zero" speed signal to be discussed hereinafter. Also, the output conductor 526 or from the gate 524 is fed to a horizontal set reference counter noninverting gate 530 through a noninverting ate circuit 532 and an inverting gate circuit 534. The output signal from the gate 530 is utilized to set the horizontal reference counter at the end of the complete cycle in the horizontal mode. Also, the system enable signal on an output conductor 526 will rise to a logical 1 level at the start of the horizontal cycle and will drop to a logical 0 level at the end of the horizontal cycle. This signal is inverted by means of an inverter circuit 538 and the output signal on conductor 540 will rise to a logical 1 level at the end of the horizontal cycle. This pulse is fed to the main control to indicate the end of the horizontal cycle.

The system further includes a horizontal operate counter noninverting gate 550 which receives an input signal on an input conductor 552 from the output circuit of the gate 524. This signal is "ANDed" with a horizontal decelerate input signal on conductor 556. Thus, the signal on conductor 552 indicates that command has been received to go forward or reverse, and a decelerate signal has been received on conductor 556. When these conditions occur, a horizontal operate counter signal is provided on an output conductor 558. The use of this signal will be described in conjunction with the description of FIGS. 18 to 21.

Also, the signal on conductor 522 is fed through a noninverting gate circuit 564 by means of a conductors 566, the output signal from the gate 564 being fed to a horizontal clear reference counter output conductor 566 to clear the reference counter when the output signal on conductor 566 is at a logical 0 level. When the signal on conductor 566 rises to a logical 1 level, the reference counter is enabled to accept data or a digital speed signal from the digital switches. This will be described more fully in conjunction with the description of FIGS. 15 to 17. In the vertical circuit, an additional signal is provided to the input circuit of gate 564, the signal being called the vertical creep signal and the vertical creep signal is fed through an inverter circuit to the input of the gate 564.

Further, the horizontal circuit includes an extra pretravel conductor 570, the signal on conductor 570 being utilized to initiate an extra pretravel in the horizontal mode of operation to permit the robot to be operated for an extra pretravel distance in the situation where the bays are spaced differently in the same aisle. For example, the home position may have a longer or shorter space to the first bay relative to the dimension of the bays. In the vertical circuit, this extra pretravel signal is not present.

Referring back to FIG. 13, a horizontal short approach input signal is fed from the main control panel to an input conductor 576. The signal on conductor 576 is fed to a noninverting gate circuit 578, the circuit also including an input signal from a horizontal decelerate mode output conductor 580, to be described later.

When the horizontal travel comparator, to be described in conjunction with FIGS. 18 to 21, achieves a comparison between the two numbers presented to the comparator, an output signal is generated in the circuit disclosed in FIGS. 18 to 21, which signal is impressed on an input conductor 590. Upon achievement of the comparison, the signal on conductor 590 rises from a logical 0 to a logical 1 level. The signal on conductor 590 is fed to a noninverting gate circuit 592, the gate circuit 592 also including an input from the horizontal tach count on a conductor 594. Thus, the pulses generated by the horizontal tachometer are fed to an input conductor 596 to an inverting gate circuit 598.

These output pulses are impressed on conductor 594 and "ANDed" with the signals on conductor 590. Thus, when the signal on conductor 590 rises from a logical 0 to a logical 1 level and the signal on conductor 594 drops to a logical 0 level when going from a pulse to a nonpulse and then again rises to a logical 1 level, the output signal from gate 592 will also rise to a logical 1 level. Thus, the positive pulse from the output gate 592 appears at the end of the pulse which caused the horizontal travel comparator to achieve an identity between the two numbers. This is true because of the inverting characteristics of the circuit 598. The signal from gate 592 is fed to the input circuit of the flip-flop 494 by means of a conductor 596. The output of flip-flop 494 is fed to the input of a noninverting gate 598 by means of a conductor 600.

Accordingly, when the output pulse from gate 592 rises to a logical 1 level, the signal on input conductor will rise to a logical 1 level. This signal is "ANDed" to the inverse side of the horizontal tach count which has been inverted through a gate 604. This signal is fed on conductors 606 to the input circuit of gate 598. The output of gate 598 is used to set flip-flop 496 to generate a horizontal decelerate mode signal on conductor 580 and also to generate a horizontal pretravel mode signal on conductor 610 through an inverting circuit 612. The flip-flop 496 comprises a pretravel complete memory circuit described in conjunction with FIG. 9 and the output signal on conductor 610 indicates the completion of the pretravel mode of operation and the signal on conductor 580 indicates the start of the deceleration portion of the decelerate cycle.

The signal on conductor 596 is also fed to an inverting gate circuit 620, through an expansion gate 622, to generate a clear travel counter signal on an output conductor 624 from the rise in the pulse from the horizontal tach count on conductor 594, which rise caused the rise in the output signal from gate 592. A drop in the signal on output conductors 624 will then occur to clear the travel counter. Additional circuit elements in the chain between the travel comparator and the clearing of the travel counter are utilized to insure that there is not an electronic race between the setting of the circuit and a loss of the pretravel number. Also the fact that a command has been received is fed to the gate 620 by means of a signal on a conductor 630.

The horizontal short approach signal is also fed through the noninverting gate 578 to a short approach and pretravel mode output conductor 632. The signal conductor 632 is inverted through an inverter circuit 634 to provide a horizontal long approach signal on output conductor 636. Also, the long approach signal is fed through a noninverting gate 640, the gate 640 also including an input signal to indicate the pretravel mode on conductor 642. The output of gate 640 is fed through a horizontal long approach and pretravel mode output conductor 646. The output of flip-flops 488 and 490 are fed to the relays controlling the forward and reverse modes of the hydraulic motor by means of signals on a forward output conductor 648 and a reverse output conductor 650. These signals are fed through inverter circuits 652, 654 and are fed to the main control.

The horizontal tach count signals are fed directly from the gate 598 and those fed through the inverter circuit 604 are fed to FIG. 14 by means of conductors 662 respectively. The signals on conductor 660 and 662 are fed to timing circuits 666, 668, respectively, the timing circuits including an input signal from the horizontal system enable conductor 526 by means of a conductor 670. Thus, when the system is enabled, the timing circuit 666 and 668 will sense the generation of pulses on conductors 660 and 662 during the period that the robot is moving. When the robot is stopped or very nearly stopped, the generation of pulses becomes very widely spaced or are discontinued completely. The timing circuits 666 and 668 are set to time out at 10 milliseconds to provide an output signal on either conductor 672 or conductor 674 depending on whether the robot stopped on the generation of the pulse or on the lack of generation of a pulse, it being understood that substantially equal possibilities exist that the robot will stop on one or the other. If one of the timers 666, 668 times out, a pulse will be fed to the OR-gate 678 which provides a zero speed signal on conductor 528. In this way, the system is disabled until such time as a new command is received.

The system further includes a power supply logic enable output signal on a conductor 680 which is fed to the input circuit of the horizontal system enable gate 524 to inhibit the gate 524 during the period that the power supply is coming up. When the power supply settles to a steady level, the signal on conductor 680 will permit the gate 524 to enable the horizontal system.

Figure 15:
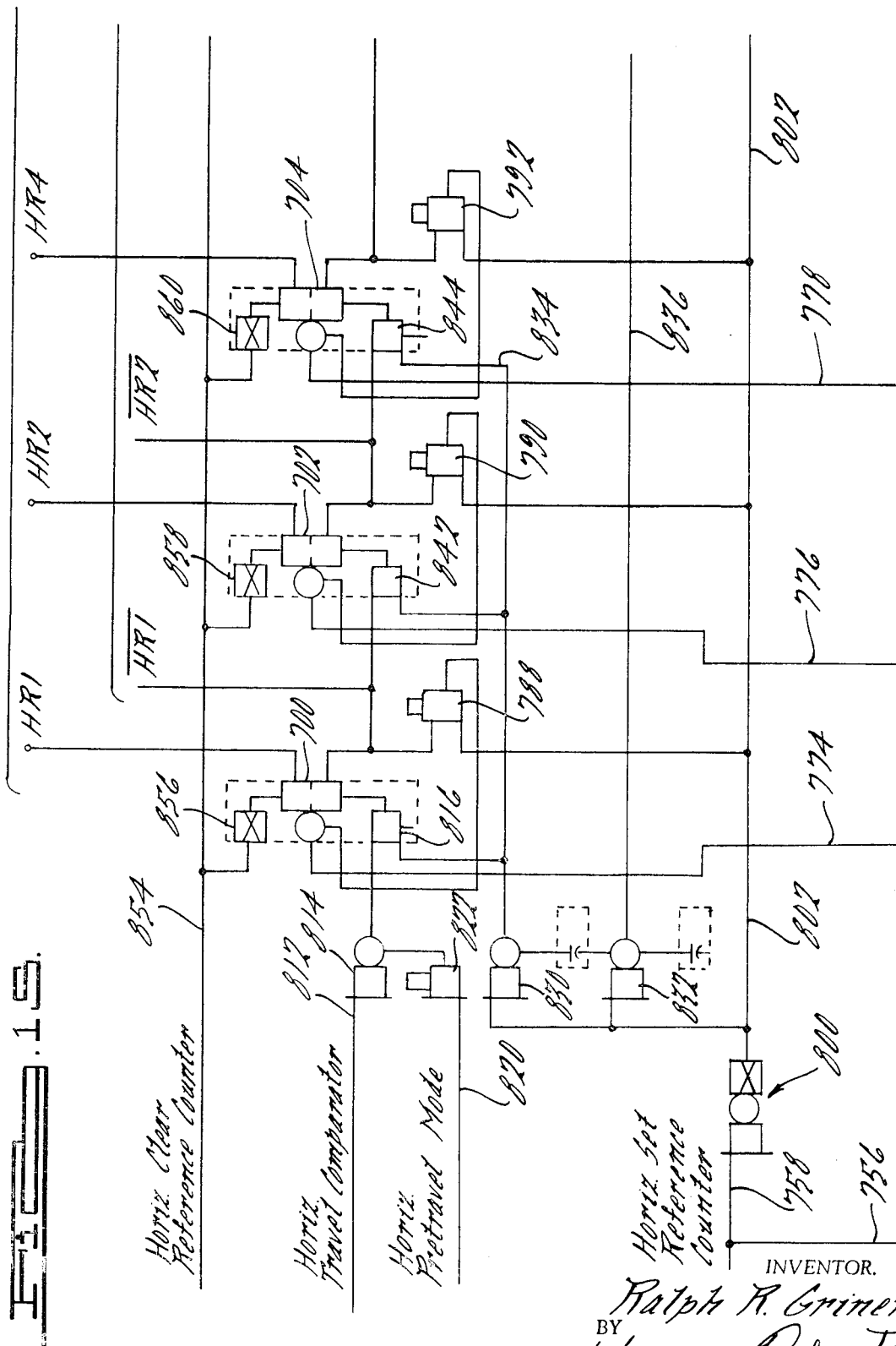
FIG. 15 is a portion of a schematic diagram illustrating a segment of the horizontal reference counter.
Figure 16:
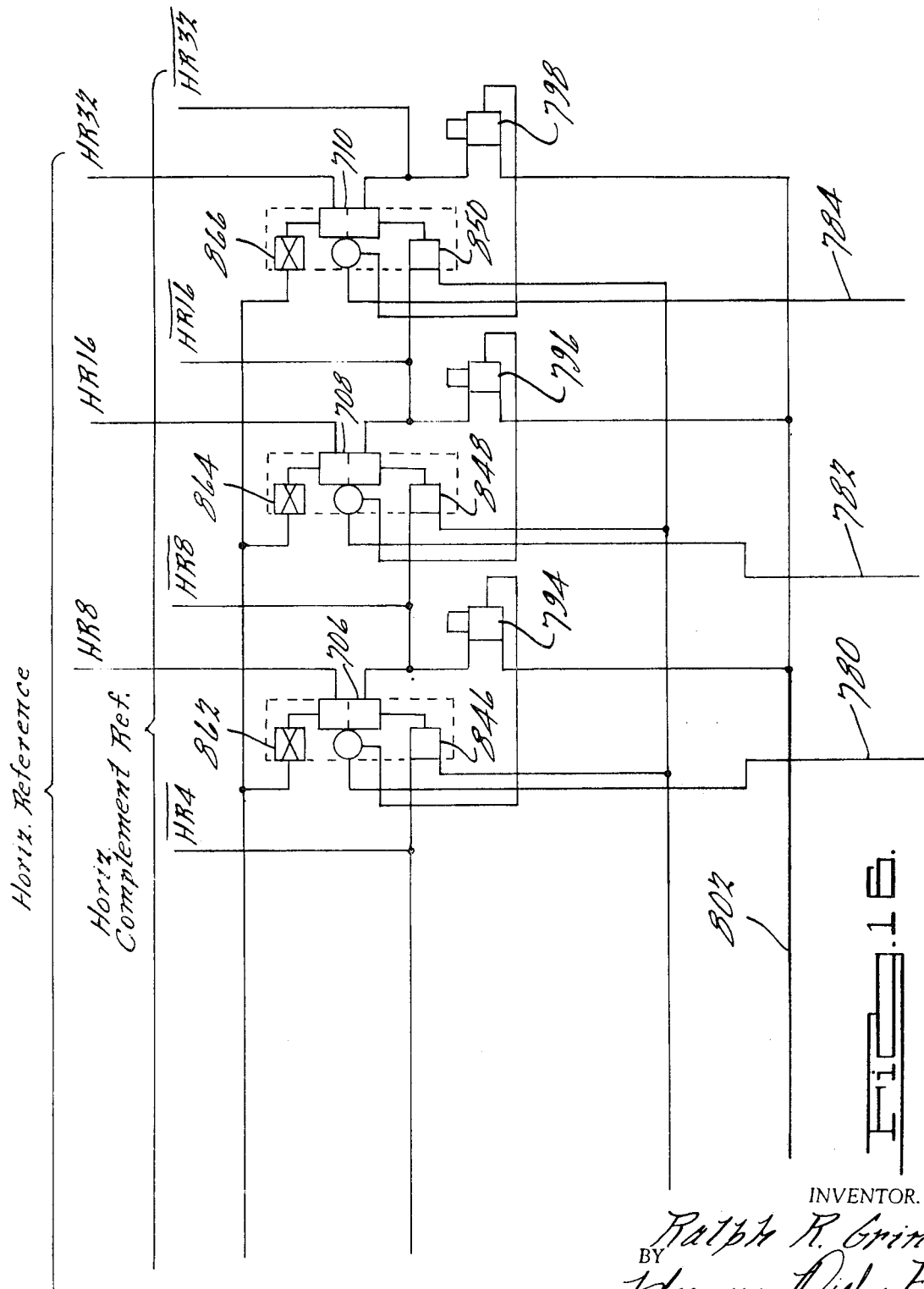
FIG. 16 is a portion of a schematic diagram and particularly illustrating the remainder of the horizontal reference counter.
Figure 17:
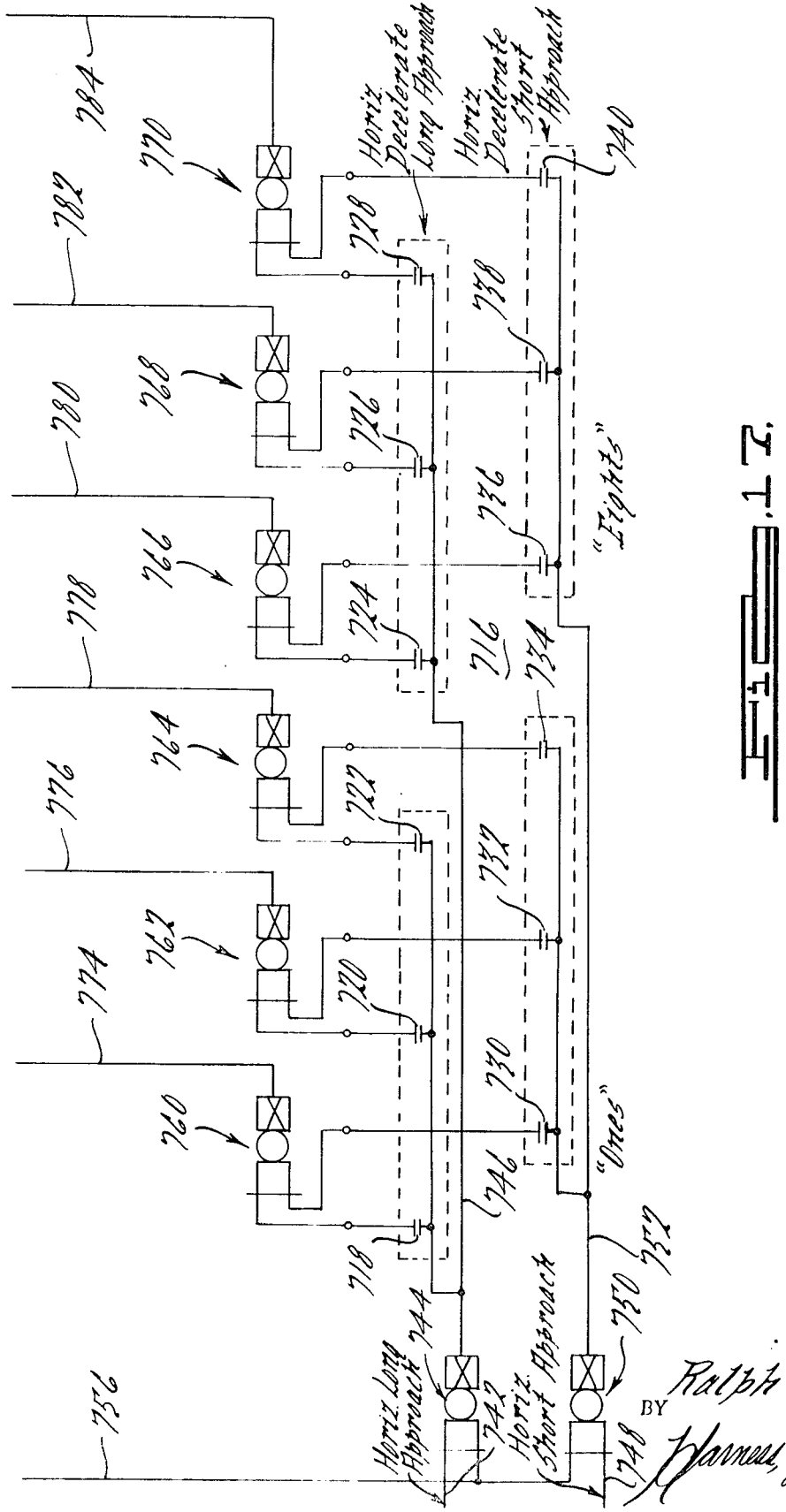
FIG. 17 is a still further portion of a schematic diagram illustrating certain features of the present invention and particularly the horizontal initial speed input.

Referring now to FIGS. 15, 16 and 17, there is illustrated a six-bit, presettable, down counter in FIGS. 15 and 16 and an initial speed setting in FIG. 17.

Referring specifically to FIG. 15, there is illustrated the first three bits of the down counter or speed reference counter which includes flip-flop circuits 700, 702, 704. FIG. 16 includes the last three bits which are provided by flip-flops 706, 708, 710. The bits for the flip-flops 700 to 710 are provided by means of a long approach and short approach decimal switch circuit 716.

Specifically, the decimal switch circuit includes a plurality of switch contacts 718 to 728 which represent the horizontal decelerate long approach binary number and a second set 730 to 740 which represents the horizontal short approach decimal number. The input signal to energize the switches 718 to 728 for the long approach is fed on an input conductor 742 and is fed through an inverting gate 744 to a line 746 which is common to all the switches 718 to 728. Similarly, a short approach input signal is fed on input conductor 748 and through an inverting gate 750 to a conductor 752 which is common to all the switches 730 to 740. The gate 744 and 750 are enabled by a horizontal set reference counter enable signal on conductor 756 which is impressed on an input conductor 758. The switches 718 to 728 may be closed in any combination, the closing of the switch indicating that the particular number associated with the switch is not to be set into the horizontal reference counter. Similarly, any combination of switches 730 to 740 may be set for the short approach number.

The switches 718, 730 are connected into an inverting gate 760, switches 727, 732 into a gate 762, switches 722 and 734 into a gate 764, switches 724 and 736 into a gate 766, switches 726 and 738 into a gate 768, and switches 728 and 740 into a gate 770. Thus, when either the long or short approach input gate 744, 750 is energized a plurality of output digital signals will be provided on output conductors 774 to 784 respectively. These signals are fed to the input circuits of the flip-flops 700 to 710 respectively.

The flip-flops 700 to 710 include a plurality of feedback latching circuits in the form of gates 788 to 798 respectively. The gates include an input circuit which is fed a feedback signal from the horizontal set reference counter input gate 800 by means of a conductor 802, the signal on conductor 802 inhibits the latching circuit 788 during the time that the reference counter is being set with the input data on conductors 774 and 784. The combination of the flip-flops 700 to 710 and the feedback gates 788 to 798 comprise a down counter of the binary type which is decremented each time an input signal is received from the horizontal comparator circuit on an input conductor 812. This signal is fed through a noninverting gate circuit 814 to the input circuit of the first flip-flop 700 through a gate 816. The circuit 814 is inhibited when the system is in the pretravel mode of operation by means of a conductor 820 and a gate circuit 822.

When the reference counter is to be set, the output signal from gate 800 is fed through a pair of gates 830, 832 and lines 834, 836 to the input sections of the flip-flops 700 to 710. The first flip-flop 700 is set by a signal from gate 816 which is connected to the output circuit of the travel comparator gate. However, subsequent flip-flops 702 to 710 are interconnected with the output circuit of the preceding stage through a plurality of gates 842 to 850. The down counter is of the conventional type wherein binary information is initially set into the respective channels of the down counter and is decremented in response to the input pulses. The counter is cleared by means of a pulse on a clear reference counter conductor 854, the signal being fed through a plurality of inverter circuits 856 to 866 respectively.

The output signals from the counter are fed to the horizontal reference output conductors $\overline{HR1}$, $\overline{HR2}$ $\overline{HR4}$, $\overline{HR8}$, $\overline{HR16}$, and $\overline{HR32}$, and the complements of the counter are fed to the output conductors HR1, HR2, HR4, HR8, HR16, and HR32. The information set into the digital switches of FIG. 17 is fed into the reference counter during an initial period and the number is decremented subsequently is response to the successive achievement of a coincidence in the travel comparator circuit. The counter is decremented to a count of zero as described in conjunction with FIG. 9 at which time the bias set into the analog-summing circuit takes over to create a creep speed mode of operation.

Referring now to FIGS. 18 to 21, there is illustrated the horizontal travel comparator circuit 888 which is utilized to compare the digital count stored in the horizontal reference counter with the number of pulses that is counted by a two-stage travel counter circuit 892. THe travel counter circuit 890, 892 is utilized to count the pulses being generated by the horizontal tachometer. The circuit of FIGS. 20 and 21 includes the two sections of the multiplex gate circuit which is adapted to feed one of three inputs to the lower section of the travel comparator, this is, from the travel counter or from the long approach pretravel switches or the short approach pretravel switches.

Figure 20:
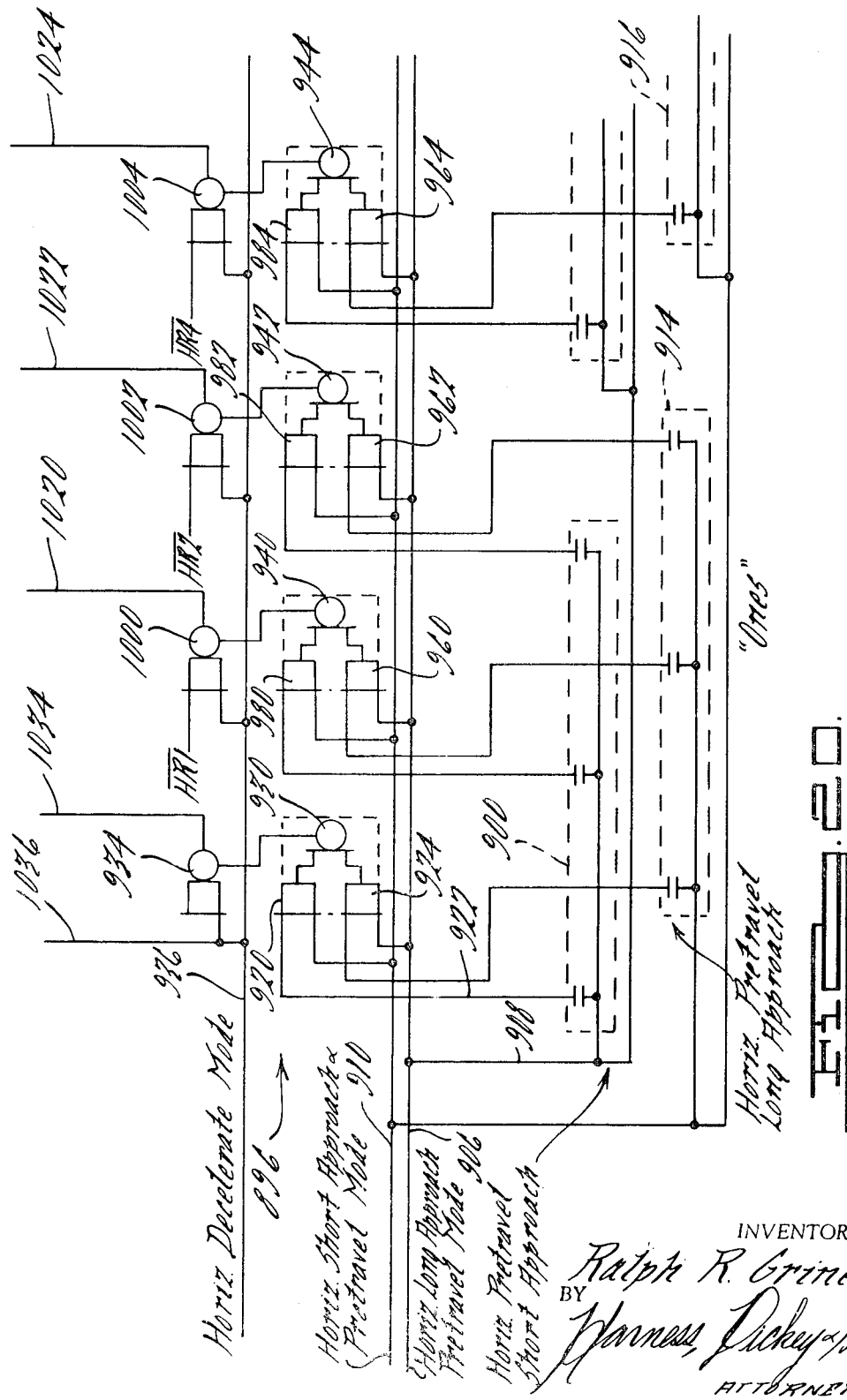
FIG. 20 is a schematic diagram illustrating certain portions of the present invention and particularly the multiplex gates.
Figure 21:
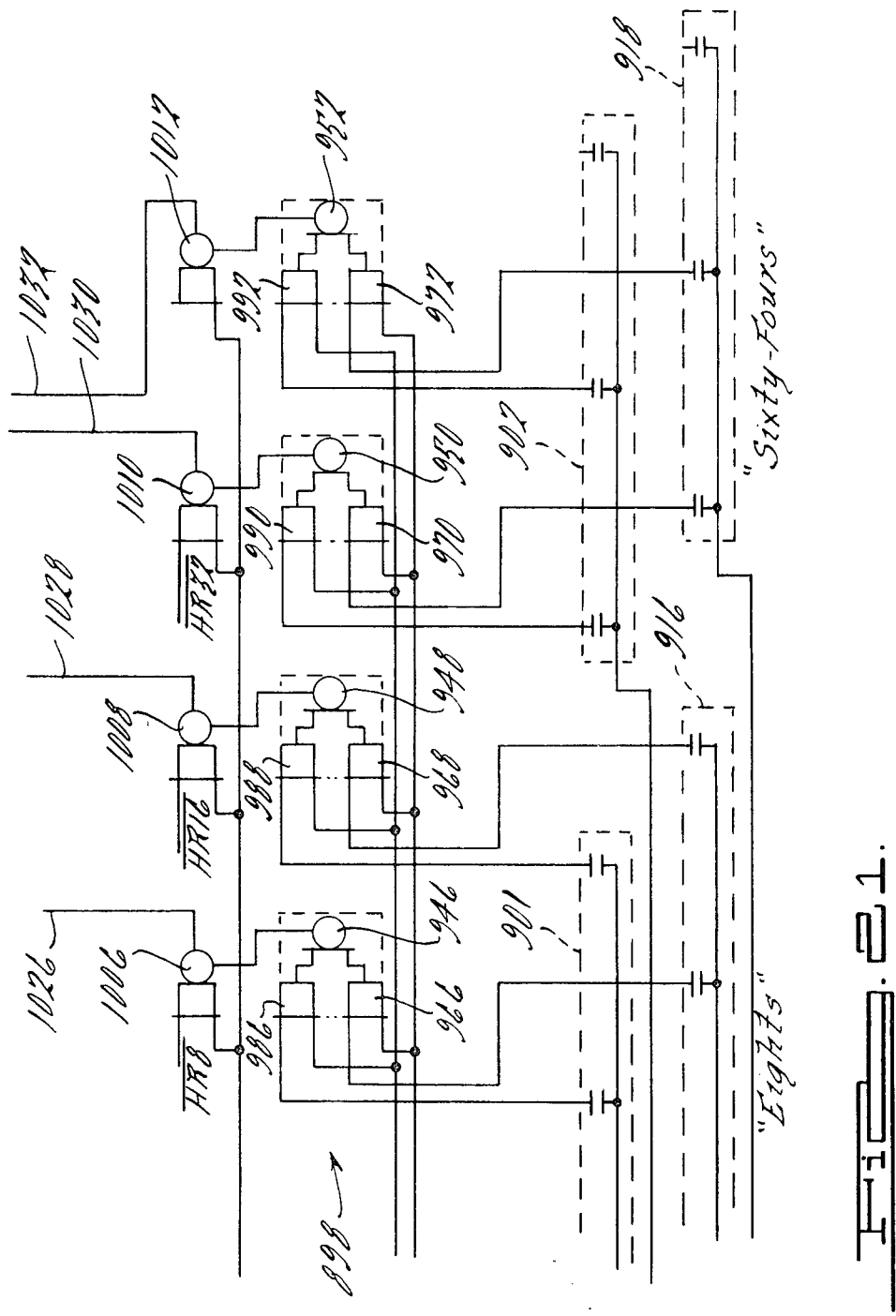
FIG. 21 is a final portion of a schematic diagram illustrating the remainder of the multiplex gates of the system.

Specifically referring to FIGS. 20 and 21, the system includes a plurality of short approach digital switches 900, 901, 902 which are adapted to be settable to he desired short approach pretravel distance. One end of the switches 900, 901, 902 is connected to a horizontal long approach and pretravel mode conductor 906 and an interconnecting conductor 908. It is to be noted that the short approach switches 900, 901, 902 are connected to the long approach pretravel mode input conductor 906. In the particular circuit illustrated the signal appearing on the long approach conductor will drop to a logical 0 level if the system is in the short approach mode. On the other hand, if the system is in the long approach mode, the signal on conductor 906 will go from a logical 0 to a logical 1 level.

A short approach and pretravel mode input conductor 910 is interconnected with a plurality of long approach digital switches 914, 916 and 918 for control thereof, the signal level on the short approach conductor controlling the output of the switches 914 to 918. Assuming, for example, that the system is in the long approach mode, the appropriate long approach switches 914, 918 will be open or closed depending on the digital number required. Since the system is in the long approach, the signal level on conductor 910 will be at a logical 0 level. The conductor 910 is directed into an "AND" gate 920 along with one of the short approach switches 900, the latter switch being connected by means of a conductor 922. Similarly, a second "AND" gate 924 is provided with an input from a long approach switch 914 and the horizontal long approach signal on conductor 906. The output of gates 920 and 924 is "OR" by means of OR-gate 930. The output of OR-gate 930 is fed into a second "OR" gate 934 which includes an input from the horizontal decelerate mode input conductor 936 for a purpose to be hereinafter explained.

The system includes a plurality of additional "OR" gates 940, 942, 944, 946, 948, 950, 952 which are fed, in the one instance, by the long approach switches through a plurality of "AND" gates 960 to 972, these latter gates also including an input from the horizontal long approach and pretravel mode input conductor. Further, the short approach switches 900 to 902 are interconnected with the "OR" gates 940 to 952 by means of a second set of "AND" gates 980 to 992. The output of the "OR" gates 940 to 952 are fed to a second set of "OR" gates 1000 to 1012, the gates 1000 to 1010 including inputs from the complimentary sides of the horizontal travel register channels HR1, HR2, HR4, HR8, HR16 and HR32. The final gate 1012 merely fills out the last channel of the comparator. The outputs from the gates 1000 to 1012 are fed to the input circuits of the travel comparator by means of conductors 1020 to 1032. Also, the output of gate 934 is fed through the first channel of the travel comparator by means of a conductor 1034. The horizontal decelerate mode signal on conductor 936 is fed to the circuit of FIG. 18 by means of a conductor 1036, for a purpose to be explained hereinafter.

Figure 18:
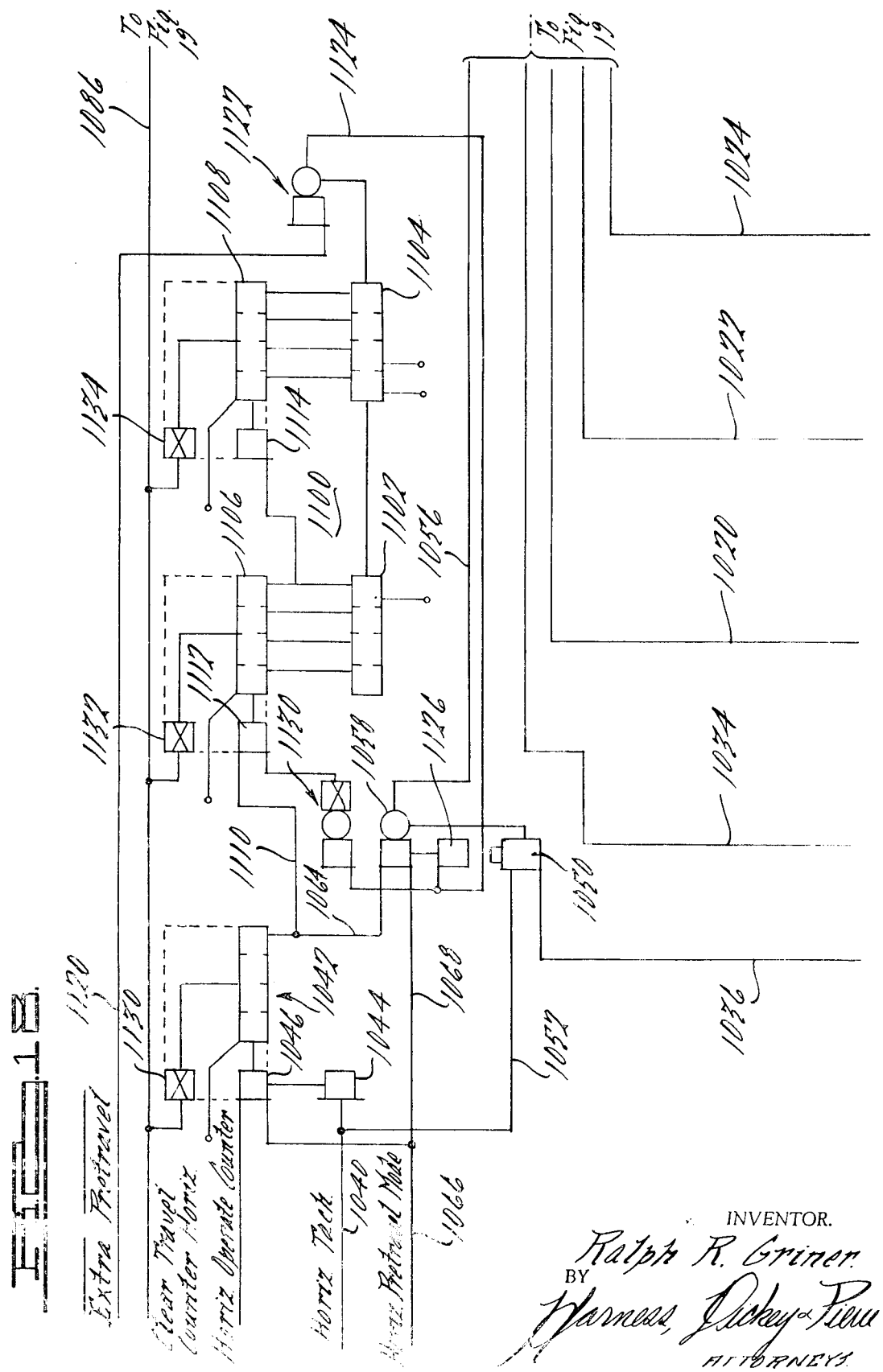
FIG. 18 is still another portion of a schematic diagram illustrating certain other features of the horizontal system including the additional pretravel circuit.
Figure 19:
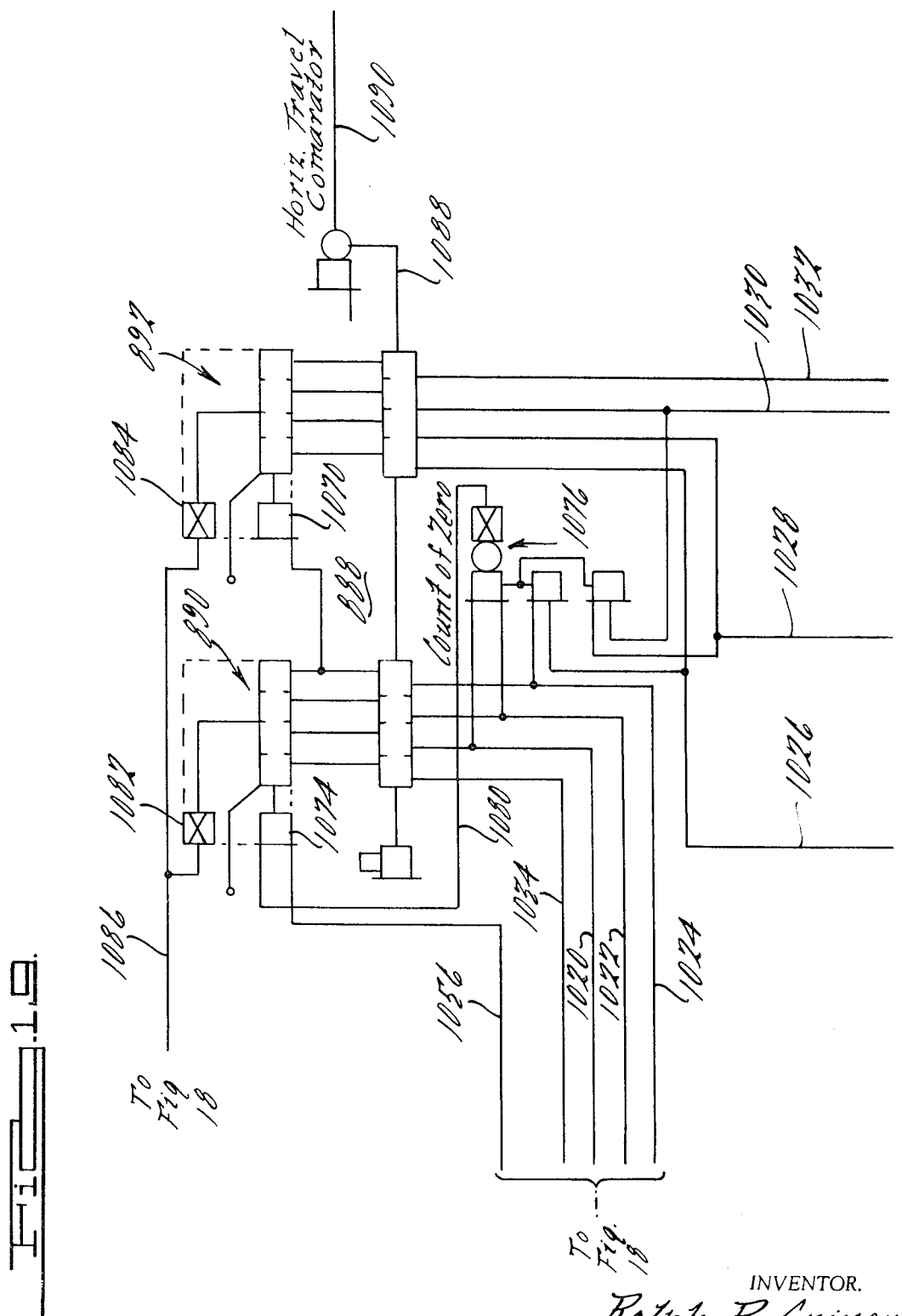
FIG. 19 is a portion of a schematic diagram illustrating certain features of the present invention, and particularly illustrating the horizontal travel comparator.

Referring now more particularly to FIGS. 18 and 19, tachometer pulses are fed to a horizontal tach input conductor 1040, the tach pulses being fed either to a pretravel count divider circuit 1042 through a gate 1044 and a second gate 1046, or the tach pulses are directed to an "AND" gate 1050 by means of a conductor 1052. The gate 1050 also includes an input from the horizontal decelerate mode conductor 1036 utilized to direct the tach pulses directly to the travel counter by means of a conductor 1056 and an "OR" gate 1058. Gate 1058 includes an input "AND" gate section wherein pulses from the tachometer are fed through the gate 1044 and the gate 1056, to the counter 1042, and the counter provides an output pulse on conductor 1064 for each 16 pulses that are generated by the tach. If the system is in the horizontal pretravel mode, the horizontal pretravel mode conductor 1066 will provide an enabling signal on conductor 1068.

Thus, the tach pulses either go trough the 16-count divider 1042 or through the gate 1050 depending on whether the system is in the pretravel mode or not in the pretravel mode. The pulses on conductor 1056 are fed into the input section of the travel counter 890, 892, the output of the first section 890 being coupled to the second section 892 by means of a gate 1070. The pulses on conductor 1056 are fed through an "AND" gate 1074, the gates 1074 also including an input from a count of zero inverting gate 1076. Gate 1076 includes inputs from six of the eight conductors 1020, 1022, 1024, 1026, 1028, 1030. When all of the signal levels on the conductors 1020 to 1030 are at a logical 1 level, the gate 1076 will indicate that the count of zero has been reached and provided an inhibiting signal on the conductor 1080 connected to the input of the gate 1074. This inhibit signal will stop the counting of the pulses.

The counters 890, 892 are reset by means of gates 1082 and 1084 which are connected to the clear travel counter input conductor 1086. When the comparator 1088 has achieved an identity between the number set into the lower portion of the comparator as compared to the pulses being counted by the travel counter 890, 892, an output pulse will be fed on output conductor 1088 and thence to the horizontal travel comparator output conductor 1090. The shift transition on conductor 1088 occurs when the two counts are equal or when the final pulse which achieves the equilibrium or equal count between the two sides of the comparator is generated.

The circuit of FIG. 18 also includes an extra pretravel circuit 1100 which is utilized to provide an additional pretravel in a horizontal direction. It is to be noted that this circuit does not occur in the vertical circuit because there is no additional pretravel in the vertical direction in the preferred embodiment. The extra pretravel circuit includes two four channels 1102, 1104 into which are wired a specific set number which is equivalent to the amount of pretravel distance which is desired. It is to be understood that digital switches could also be provided to set the number circuit. The binary number for the extra pretravel is set into the lower channels of a comparator circuit which includes a first four-channel comparator 1102 and a second four-channel comparator 1104. The circuit being described is substantially identical to the circuit described in conjunction with the description of FIG. 19. The pulses from the divide by 16-counter 1042 are fed to the additional pretravel counter circuit 1106, 1108 by means of a conductor 1110 and a gate 1112. The two sections of the counter circuit are interconnected by means of a gate 1114.

If an additional pretravel is required, a signal is impressed on input conductor 1120 which provides an enabling signal for a gate 1122. The output signal from the gate 1120 is impressed on the conductor 1124 and fed to the input circuit of a gate 1126 and an inverting gate circuit 1130. The gate 1126 will rout the divided-by-16 pulses directly to the main travel counter through the gate 1058 when no additional pretravel is required. However, if an additional pretravel is required, the gate 1058 is inhibited and the gate 1121 is enabled through the gate 1130. Thus, the divided-by-16 pulses from divider counter 1042 are fed by means of the conductor 1110 to the counter 1106, 1108. When a comparison has been achieved in comparator 1102, 1104, the signal from gate 1122 to conductor 1124 is removed to remove the inhibit from gate 1058. Also, the gate 1112 is inhibited, the net effect being to direct the pulses from a horizontal path to the conductor 1056. As was the case above, the counters 1042, 1106 and 1108 are cleared by means of the clear travel counter conductor 806 through gates 1130, 1132 and 1134. With the routing of the pulses to the main counter 890, 892, the second main pretravel portion of the cycle is initiated.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a material-handling apparatus for delivering material from one point to another including a carrier and a motor for driving the carrier, the improvement comprising a control system for controlling the acceleration and/or deceleration of the carrier comprising signal-generating means for generating a signal representative of a motion during at least a selected period of time, controlled conducting means transmitting said signal during a portion of said at least a selected period of time, and function generator means for generating a speed-versus-distance acceleration and/or deceleration curve in response to said transmitted signal for controlling the speed of the motor, said function generator including digital storage means for storing a digital binary number representative of a speed characteristic of the motor and providing an output signal for said speed control, the speed varying in response to the magnitude of the binary number, and means altering said binary number as a function of the distance traveled by the carrier after the start of the portion of the time to vary the speed of the carrier in accordance with the altered number.

2. The improvement of claim 1 wherein said storage means includes a presettable counter.

3. The improvement of claim 2 wherein said digital binary number is set into said counter at least as early as the start of said portion of time.

4. The improvement of claim 3 further including a digital-to-analog converter and wherein the output of said counter is used to control the speed of the carrier.

5. The improvement of claim 4 wherein said control system further includes a summing circuit and a speed-biasing circuit, the output of said converter and said biasing circuit being fed to said summing circuit, the output of the summing circuit controlling the carrier.

6. The improvement of claim 5 wherein said converter provides a predetermined speed signal to said summing circuit which may be reduced to zero, said biasing circuit producing, when said speed signal is zero, an additional speed signal to control the speed of said carrier.

7. The improvement of claim 6 wherein said biasing circuit signal is a fixed presettable signal, said biasing signal operating the carrier at a low creep speed.

8. The improvement of claim 7 wherein said speed-biasing circuit includes a creep speed reference circuit which is presettable with a digital binary signal, said speed-biasing circuit further including a digital-to-analog comparator for inverting said creep speed reference signal.

9. The improvement of claim 8 wherein the carrier is a hydraulically driven robot, the hydraulic driver including a stroking cylinder feedback assembly, and means for comparing the output of said stroking cylinder feedback assembly with said speed signal for fixing the speed of the hydraulic driver for a given speed signal.

10. The improvement of claim 9 wherein the control system further includes an analog comparator and said stroking cylinder feedback assembly provides an analog signal representative of the speed of the hydraulic driver, said analog comparator comparing the analog speed signal from said analog-summing circuit and the analog signal for said stroking cylinder feedback assembly to achieve a coincidence.

11. The improvement of claim 1 wherein said digital storage means is a presettable decrementable counter for generating a deceleration curve in response to the altering of the binary number in accordance with distance traveled.

12. The improvement of claim 1 wherein said digital storage means is a presettable incrementable counter for generating an acceleration curve in response to the altering of the binary number in accordance with the distance traveled.

13. The improvement of claim 1 wherein said altering means includes a comparator circuit, said comparator circuit being sequentially provided with a series of numbers which vary in accordance with the variation of said binary number said comparator circuit varying said binary number upon achievement of a preselected relationship between said binary number and a function of distance traveled by the carrier.

14. The improvement of claim 13 wherein said control system further includes a distance-signal generating circuit for generating an output signal which varies as a function of distance traveled by the carrier.

15. The improvement of claim 14 wherein the generation of the distance-traveled signal to said comparator circuit commences at least as late as the start of said portion of the selected period of time.

16. The improvement of claim 14 wherein said control system further includes a distance tachometer which generates a series of pulses, the number of pulses generated being a function of distance traveled.

17. The improvement of claim 16 wherein said control system further includes gating means disposed between said tachometer and said travel comparator, said gating means being controlled to provide the output pulses from said tachometer at least as late as the start of said period.

18. The improvement of claim 17 further including counting means interconnected with said tachometer to count at least certain of said output pulses from said tachometer.

19. The improvement of claim 18 wherein counting means counts all of the pulses during the period that said deceleration curve is being generated.

20. The improvement of claim 19 wherein the binary number set into said decrementable counter is fed to said comparator and the output from said tachometer pulse counting circuit is also fed to said comparator, and means for generating an output signal from said comparator when coincidence is achieved between the binary number and the tach pulses counted by said counting circuit.

21. The improvement of claim 20 wherein said output signal is fed to said decrementable counter and said tach counter circuit, said output signal resetting said counter circuit.

22. The improvement of claim 21 wherein said output signal decrements said decrementable counter.

23. The improvement of claim 22 wherein said analog signal is decreased in response to the decrementing of said decrementable counter.

24. The improvement of claim 23 wherein said decrementable counter is decremented to a count of zero.

25. The improvement of claim 24 wherein said storage means includes a presettable counter.

26. The improvement of claim 25 wherein said digital binary number is set into said counter at least as early as the start of said portion.

27. The improvement of claim 26 further including a digital-to-analog converter and wherein the output of said counter is used to control the speed of the carriage.

28. The improvement of claim 27 wherein said control system further includes a summing circuit and a speed-biasing circuit, the output of said converter and said biasing circuit being fed to said summing circuit, the output of the summing circuit controlling the carrier.

29. The improvement of claim 28 wherein the output of said decrementable counter is fed to the input circuit of said digital-to-analog converter, said converter providing a zero output signal when said counter has been decremented to zero.

30. The improvement of claim 29 wherein said speed-biasing circuit provides an additional signal to said summing circuit to maintain said carrier at a creep speed.

31. The improvement of claim 30 wherein said speed-biasing circuit includes a creep speed reference circuit which is presettable with a digital binary signal, said speed-biasing circuit further including a digital-to-analog converter for converting said creep speed reference signal.

32. The improvement of claim 31 wherein the carrier is a hydraulically driven robot, the hydraulic driver including a stroking cylinder feedback assembly, and means for comparing the output of said stroking cylinder feedback assembly with said speed signal for fixing the speed of the hydraulic driver for a given speed signal from said summing circuit.

33. The improvement of claim 32 wherein the control system further includes an analog comparator and said stroking cylinder feedback assembly provides an analog signal representative of the speed of the hydraulic driver, said analog comparator comparing the analog speed signal from said analog-summing circuit and the analog signal for said stroking cylinder feedback assembly to achieve a coincidence.

34. The improvement of claim 31 further including means for sensing a preselected position of said carrier relative to one of said one or another stations, numbers for generating a position signal in response to sensing of said position, and means for terminating said creep speed reference signal in response to said signal.

35. The improvement of claim 34 further including means for sensing the decrementing of said decrementable counter to zero, said gating means being controlled to cease transmission of pulses from said tachometer pulse counting circuit in response to decrementing said counter to zero.

36. The improvement of claim 35 further including pulse detector means for sensing the generation of pulses from said tachometer generator, said pulse detector circuit generating an output signal in response to a preselected characteristic of said tachometer generator output.

37. The improvement of claim 36 wherein said preselected characteristic is the lack of a pulse from said tachometer generator for a preset period of time.

38. The improvement of claim 37 wherein said pulse detector circuit includes means for sensing when said tach pulse generator switches from the generation of a pulse to the lack of generation of a pulse, said circuit providing an output signal when said tach pulse generator fails to switch from the generation of a pulse for a preselected period of time.

39. In a material-handling apparatus for delivering material from one station to another including a material carrier and a motor for driving the carrier, the improvement comprising a method of controlling the acceleration and/or deceleration of the carrier comprising generating a signal representative of a motion during at least a selected period of time, transmitting said signal during a portion of said at least a selected period of time, and generating a speed-versus-distance acceleration and/or deceleration curve in response to said transmitted signal for controlling the speed of the motor, including storing a digital binary number representative of a speed characteristic of the motor, generating an output signal for said speed control, the speed varying in response to the magnitude of the binary number, and altering said binary number as a function of the distance travelled by the carrier after the start of the portion of the time to vary the speed of the carrier in accordance with the altered number.

40. The method of claim 39 further including storing said binary number at least as early as the start of said portion.

41. The method of claim 40 further including using the output said of said counter to control the speed of the carriage.

42. The method of claim 41 further including providing a predetermined speed signal to a summing circuit which may be reduced to zero, and also providing a biasing signal, when said speed signal is zero, as an additional speed signal to control the speed of said carrier to operate said carrier at a presettable, fixed, low creep speed.

43. The method of claim 42 wherein the carrier is a hydraulically driven robot, the hydraulic driver including a stroking cylinder feedback assembly, and the method further including comparing the output of said stroking cylinder feedback assembly with said speed signal for fixing the speed of the hydraulic driver for a given speed signal.

44. The method of claim 43 wherein the method further includes providing an analog signal representative of the speed of the hydraulic driver, and comparing the analog speed signal and the analog signal for said stroking cylinder feedback assembly to achieve a coincidence.

45. The method of claim 39 further including providing with a series of numbers which vary in accordance with the variation of said binary number, and varying said binary number upon achievement of a preselected relationship between said binary number and a function of distance travelled by the carrier.

46. The method of claim 45 further including generating an output signal which varies as a function of distance travelled by the carrier.

47. The method claim 46 further including commencing the distance-traveled signal at least as late as the start of said portion of the selected period of time.

48. The method of claim 47 further including the step of generating a series of digital pulses as a function of distance traveled.

49. The method of claim 48 further including the step of controlling the transmission of said pulses during said portion, the start of said transmission of said pulses being at least as late as the start of said period.

50. The method of claim 49 further including the step of counting the pulses generated during said period and comparing said counted pulses with said stored binary number and generating an output signal when coincidence is achieved between the count of said pulses and said binary number.

51. The improvement of claim 50 wherein said binary number is decremented in response to achievement of coincidence.

52. The method of claim 51 wherein said binary number is decremented to a count of zero.

53. The improvement of claim 52 wherein said zero binary number provides a zero speed signal to said carrier, and the method further including providing an additional speed signal to said carrier to operate said carrier at a creep speed.

54. The method of claim 53 wherein the claim is a hydraulically driven robot, the hydraulic driver including a stroking cylinder feedback assembly including means for generating a signal as a function of the setting of said stroking cylinder, the method further including the step of comparing the signal from the output of the stroking cylinder with the speed signal, including said additional signal, for fixing the speed of the hydraulic driver for a given speed signal.

55. In a material-handling apparatus for delivering material from one point to another including a carrier and a motor for driving the carrier, the improvement comprising a control system for controlling the acceleration of the carrier comprising signal-generating means for generating a signal representative of a motion during at least a selected period of time, controlled conducting means transmitting said signal during a portion of said at least a selected period of time, and function generator means for generating a speed-versus-distance acceleration curve in response to said transmitted signal for controlling the speed of the motor, said function generator including storage means for storing a number representative of a speed characteristic of the motor and providing an output signal for said speed control, the speed varying in response to the magnitude of the number, and means altering said number as a function of the distance traveled by the carrier after the start of the portion of the time to vary the speed of the carrier in accordance with the altered number, a pretraveling portion preceding said deceleration curve, said pretravel portion being a linear distance of travel of the carrier, the control system including speed control means for controlling the carrier during both the pretravel portion and the deceleration curve, a travel comparator circuit, pulse-generating means for generating a series of pulses in response to distance traveled by the carrier, and a pretravel counting circuit for counting the pulses generated by said tach generating means, said travel comparator comparing a preset digital number with the pulses counted by the travel counter circuit and terminating the pretravel portion when coincidence is achieved between said preset number and the count of the counter circuit.

56. The improvement of claim 55 wherein said pretravel counting circuitry includes a count divider and a travel counter said count divider dividing the pulses from said tach generating means.

57. The improvement of claim 56 wherein said travel counter counts the output pulses from said count divider.

58. The improvement of claim 57 wherein said travel counter provides a digital binary input coded signal to said travel comparator circuit said travel comparator circuit comparing the output of said travel counter with said preset digital number.

59. The improvement of claim 58 wherein said control circuit includes a first and second pretravel digital storage circuit, said first pretravel storage circuit storing a large number relative to said second pretravel digital storage circuit.

60. The improvement of claim 59 wherein said first pretravel storage circuit stores a number which provides the said travel comparator with a digital number causing a greater pretravel distance than said second pretravel storage circuit.

61. The improvement of claim 60 wherein coincidence in said travel comparator generates a pretravel complete output signal.

62. The improvement of claim 61 wherein said pretravel complete signal routes said tach pulses directly to said travel counter.

63. The improvement of claim 62 wherein the control system further includes a presettable digital speed reference counter and said pretravel complete signal presents the output of said speed reference counter to said travel comparator to initiate the start of the deceleration portion of the cycle.

64. The improvement of claim 7 wherein said speed-biasing circuit includes a creep speed reference circuit which is presettable with a creep speed reference signal.

65. The improvement of claim 64 wherein the carrier is a hydraulically driven robot, the hydraulic driver including a feedback assembly, and means for comparing the output of said feedback assembly with said speed signal for fixing the speed of the hydraulic driver for a given speed signal.

66. The improvement of claim 65 wherein the control system further includes an comparator and said feedback assembly provides a signal representative of the speed of the hydraulic driver, said comparator comparing the speed signal and the signal from said feedback assembly to achieve a coincidence.

67. The improvement of claim 31 wherein the carrier is a hydraulically driven robot, the hydraulic driver including a feedback assembly, and means for comparing the output of said feedback assembly with said speed signal for fixing the speed of the hydraulic driver or a given speed signal.

68. The improvement of claim 67 wherein the control system further includes a comparator and said feedback assembly provides a signal representative of the speed of the hydraulic driver, said comparator comparing the speed signal and the signal for said feedback assembly to achieve a coincidence.

69. The method of claim 42 wherein the carrier is a hydraulically driven robot, the hydraulic driver including a feedback assembly, and the method further including comparing the output of said feedback assembly with said speed signal for fixing the speed of the hydraulic driver for a given speed signal.

70. The method of claim 69 wherein the method further includes providing a signal representative of the speed of the hydraulic driver, and comparing the speed signal and the signal for said feedback assembly to achieve a coincidence.

71. The method of claim 53 wherein the claim is a hydraulically driven robot, the hydraulic driver including a feedback assembly including means for generating a signal as a function of the setting of said feedback assembly, the method further including the step of comparing the signal from the output of the feedback assembly with the speed signal, including said additional signal, for fixing the speed of the hydraulic driver for a given speed signal.

* * * * *